Figure 39:
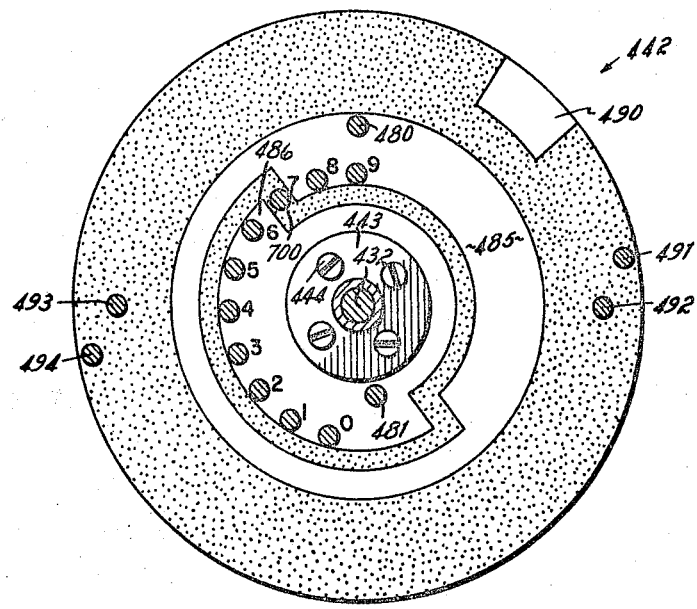

Dec. 28, 1965  R. A. LASLEY ETAL  3,225,925
CARD SELECTING APPARATUS
Filed May 9, 1963  19 Sheets-Sheet 1
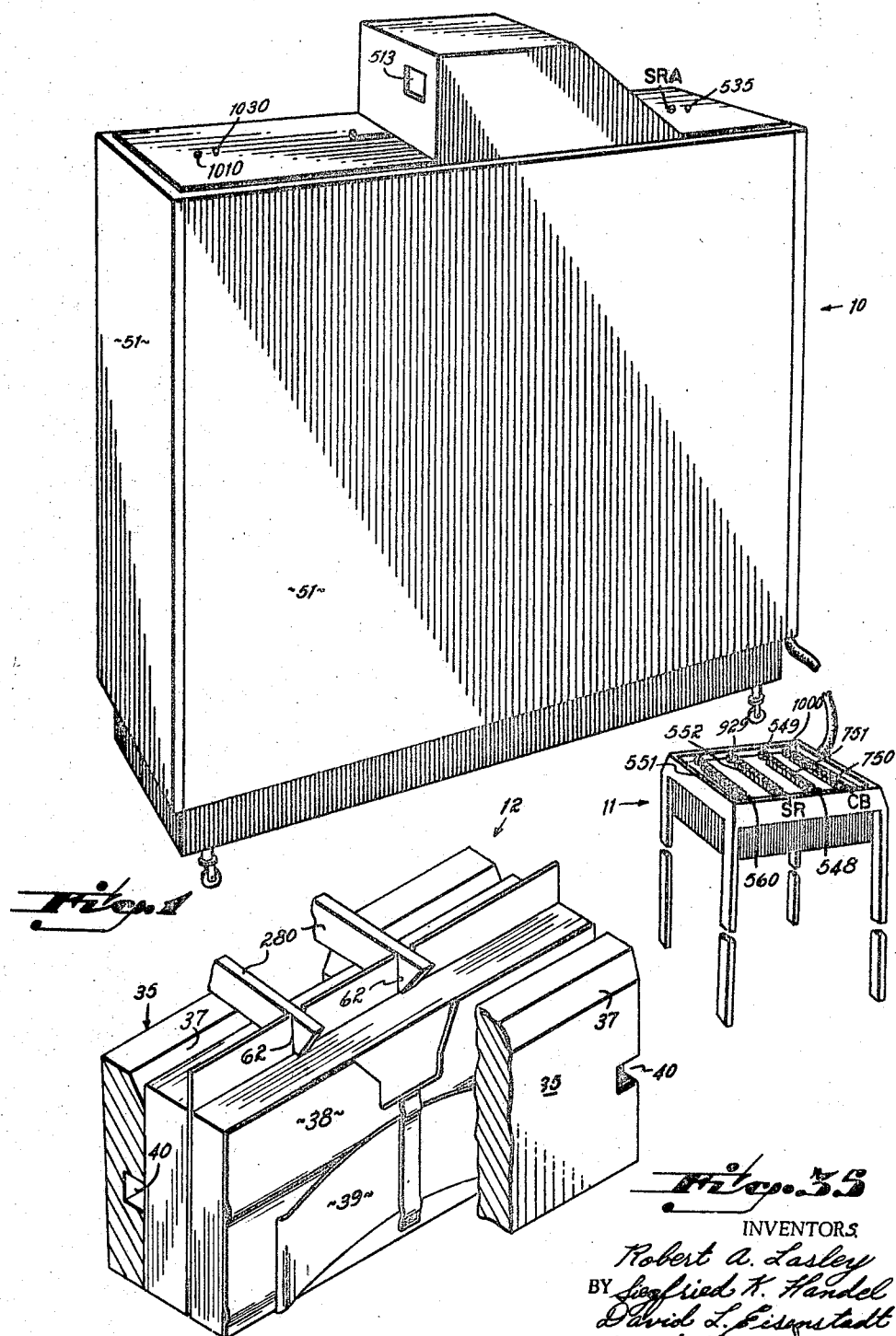
INVENTORS
Robert A. Lasley
Siegfried K. Handel
BY David L. Eisenstadt
Wood, Herron & Evans
ATTORNEYS

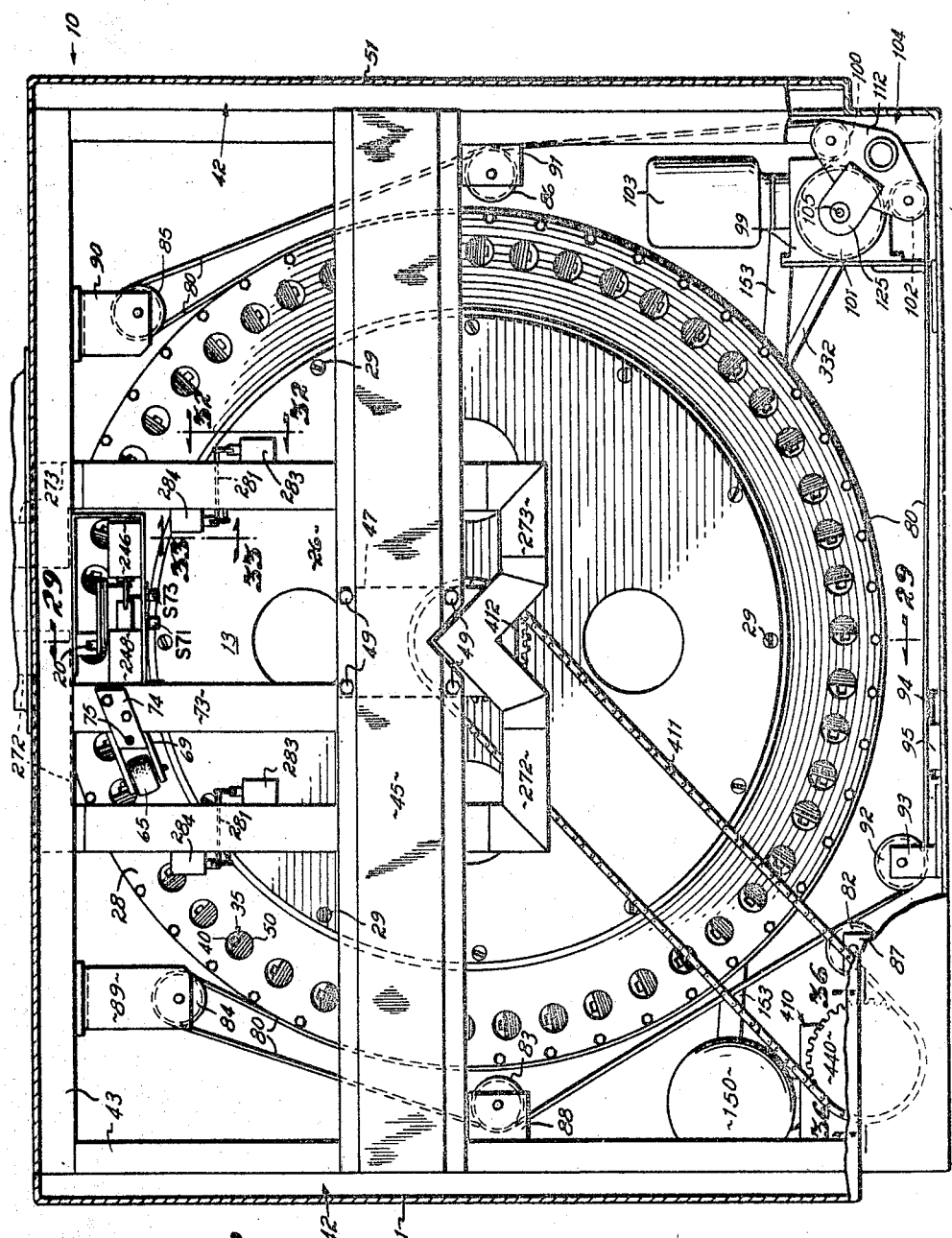

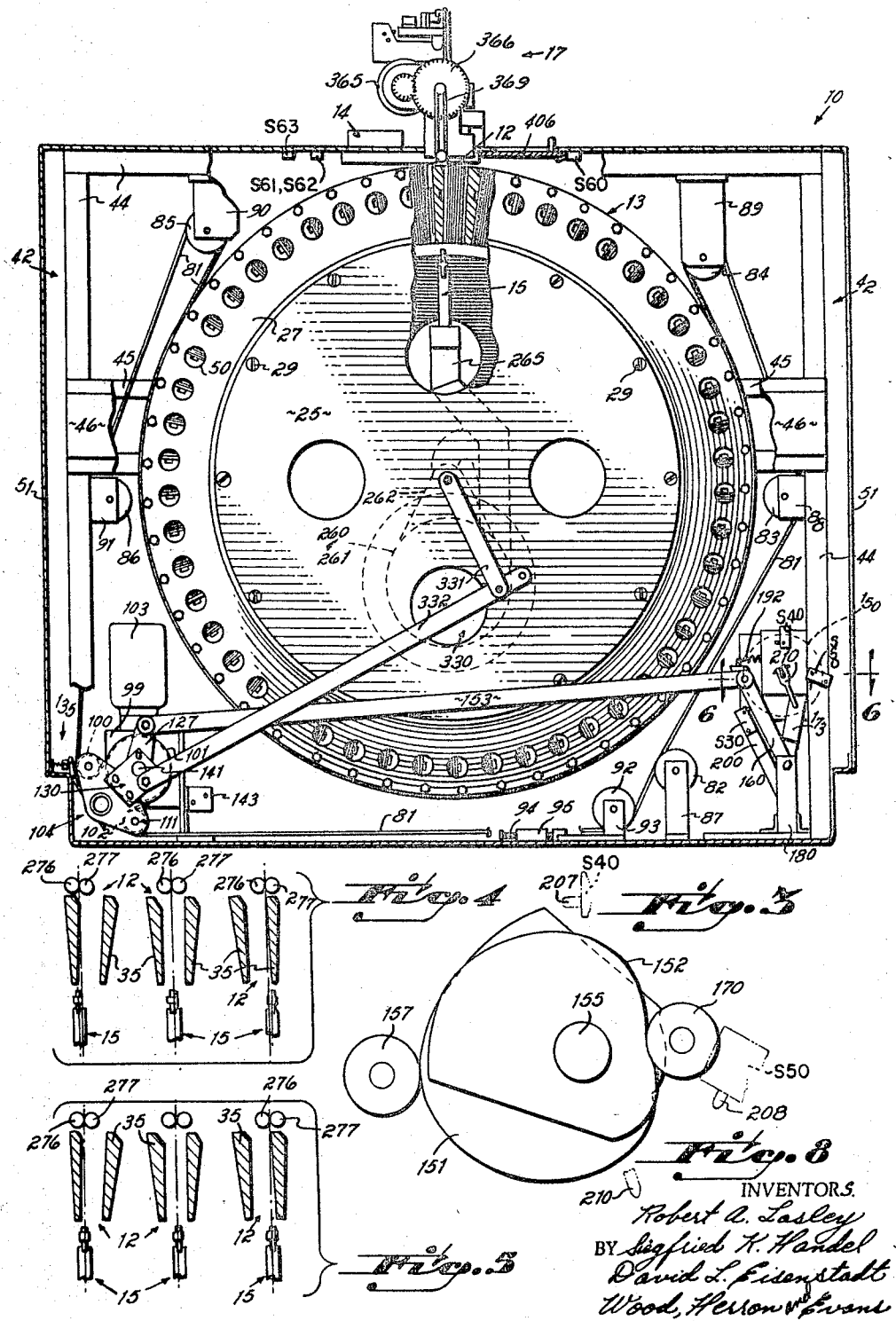

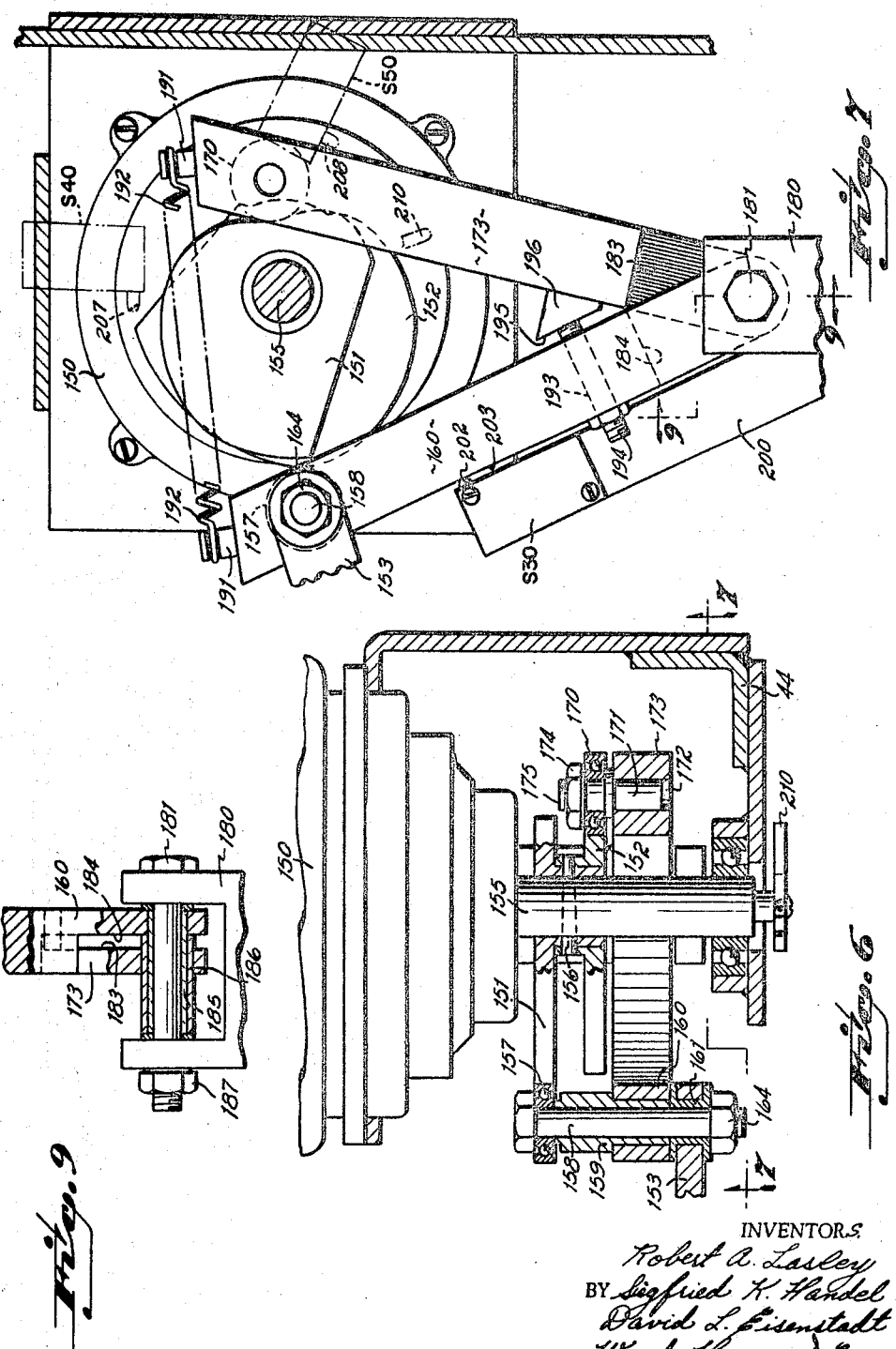

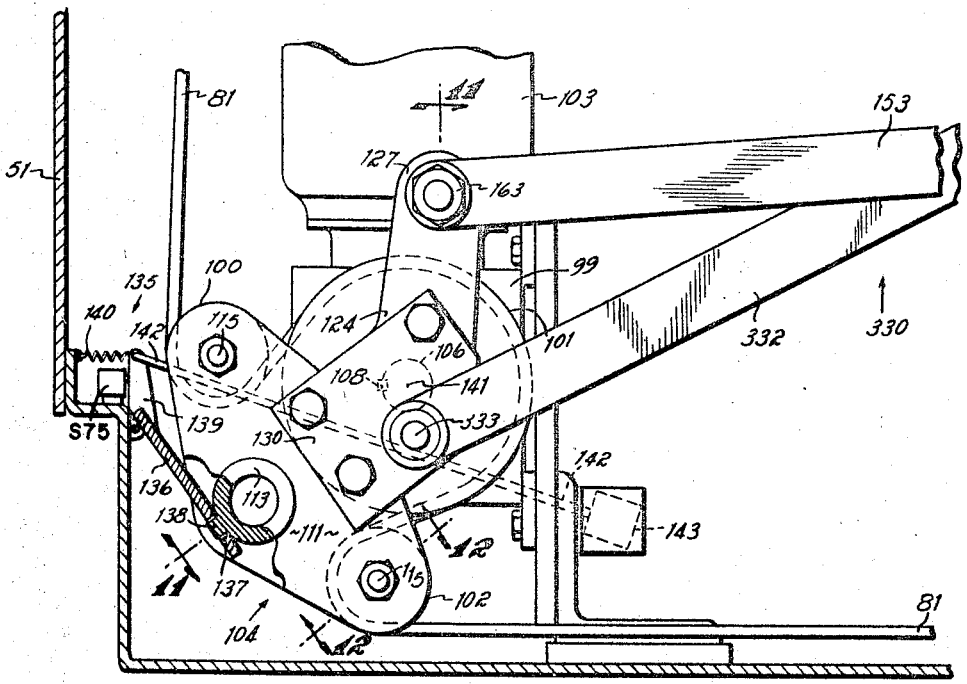
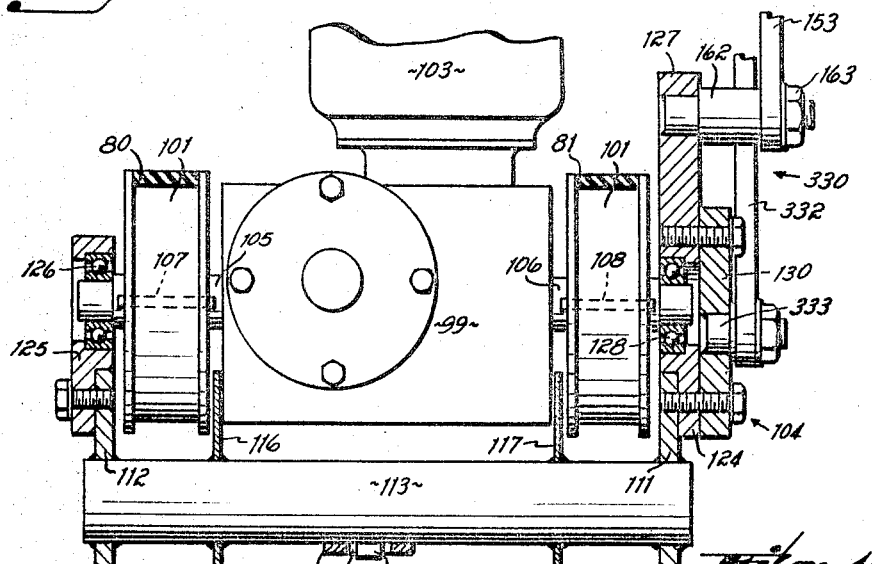

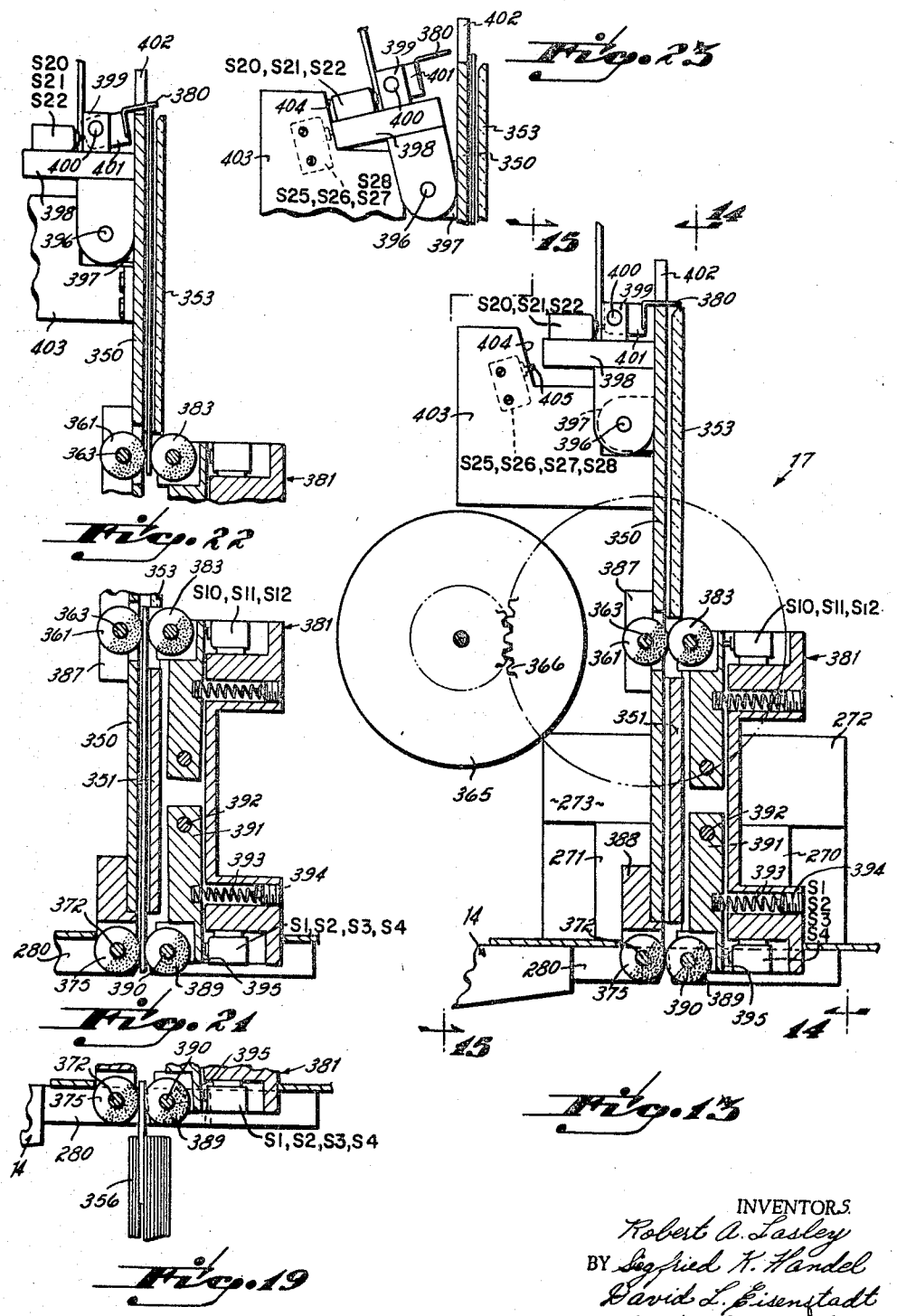

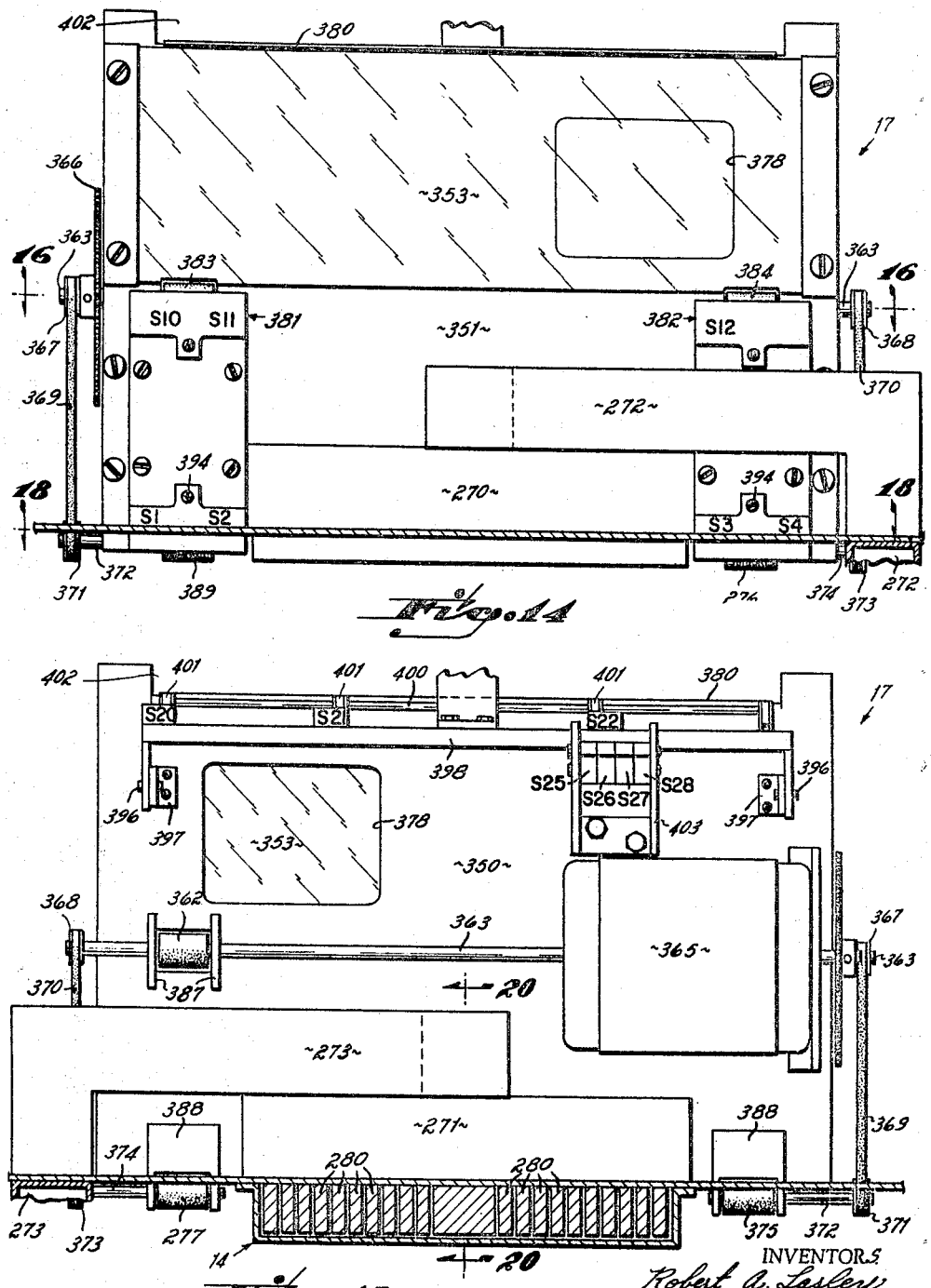

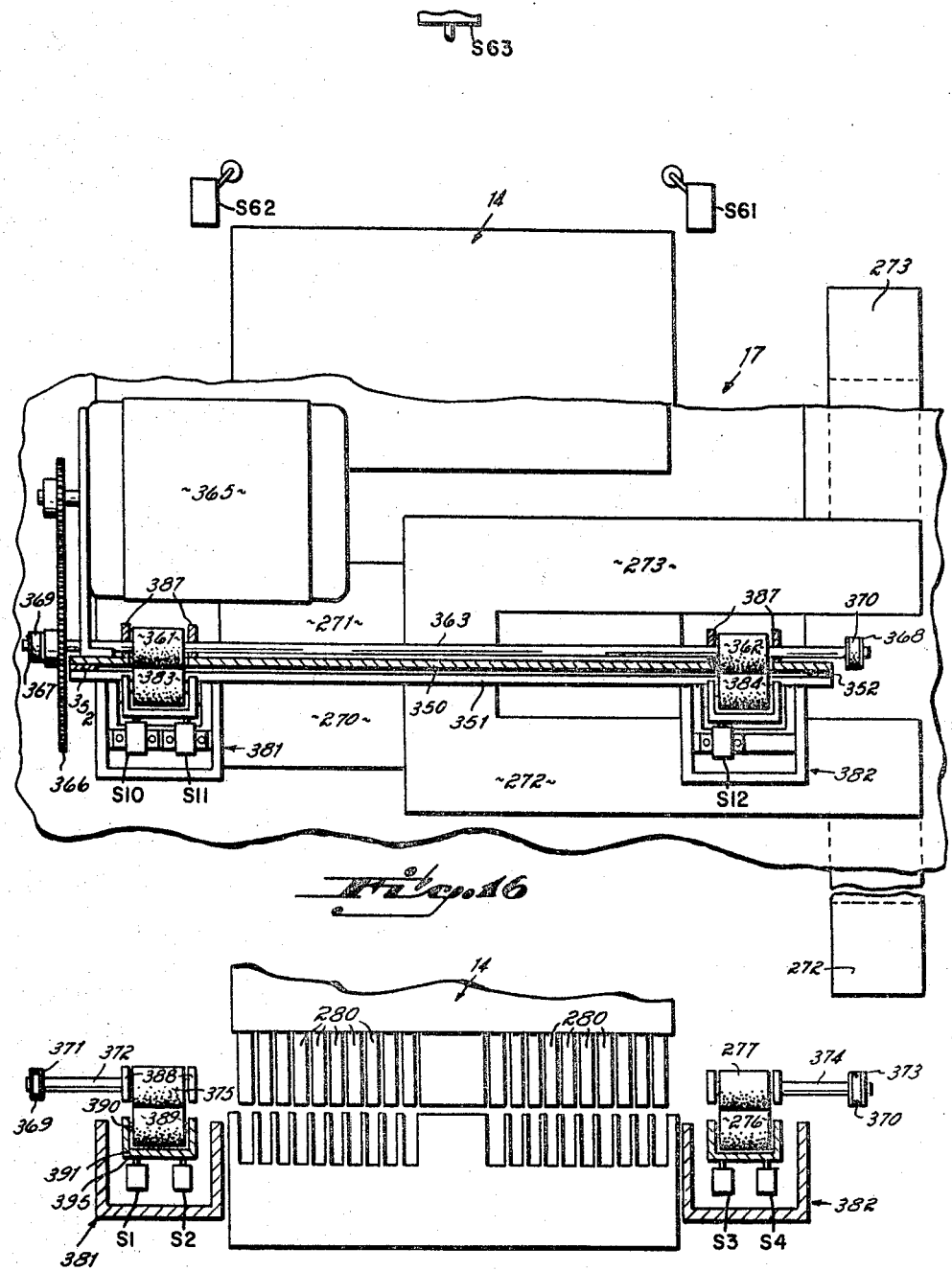

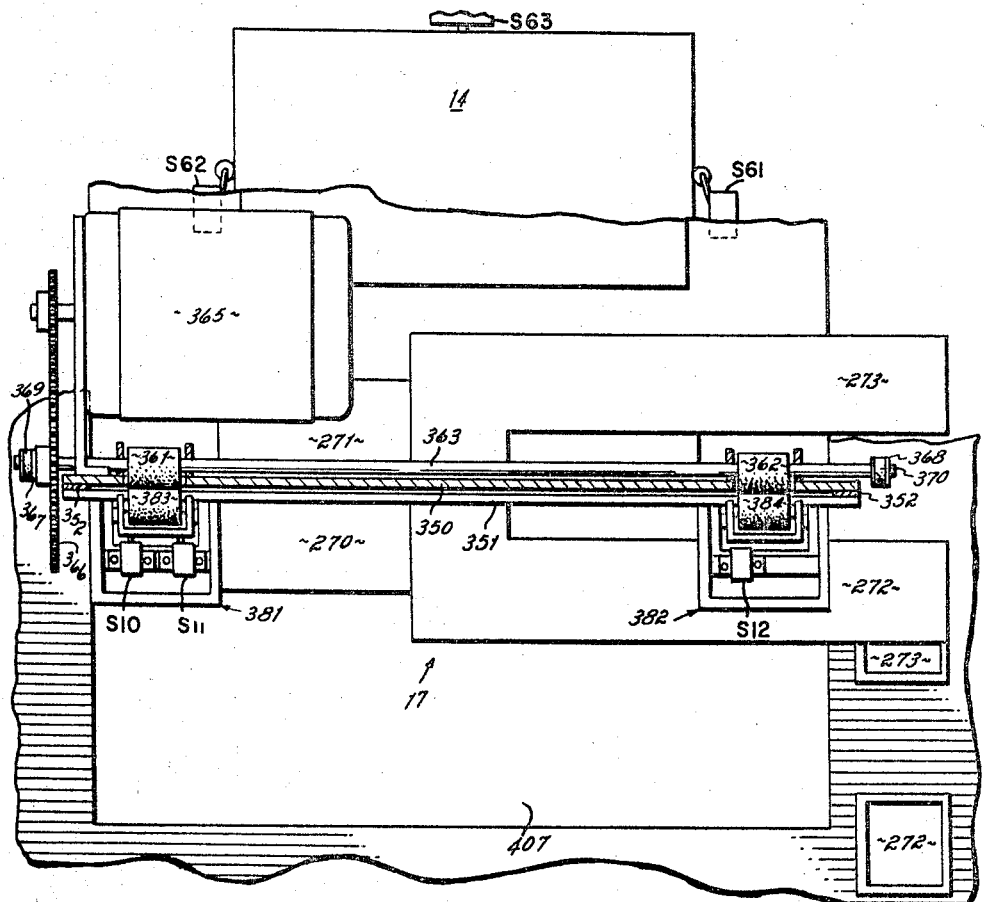
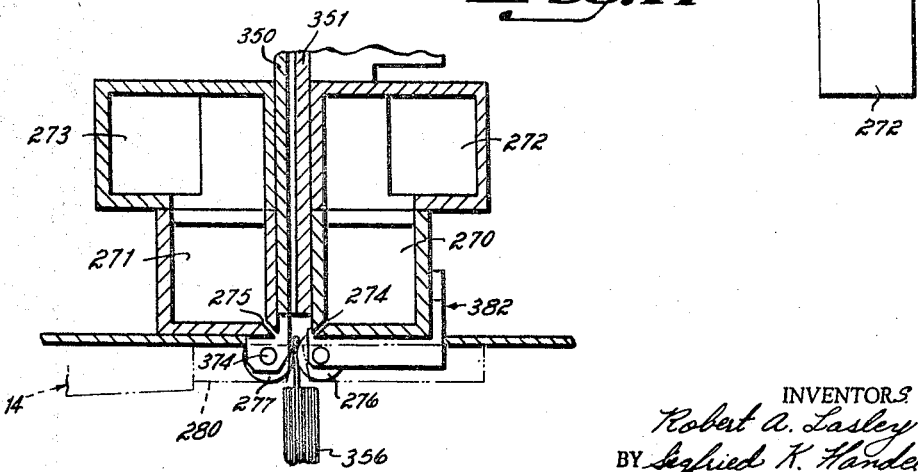

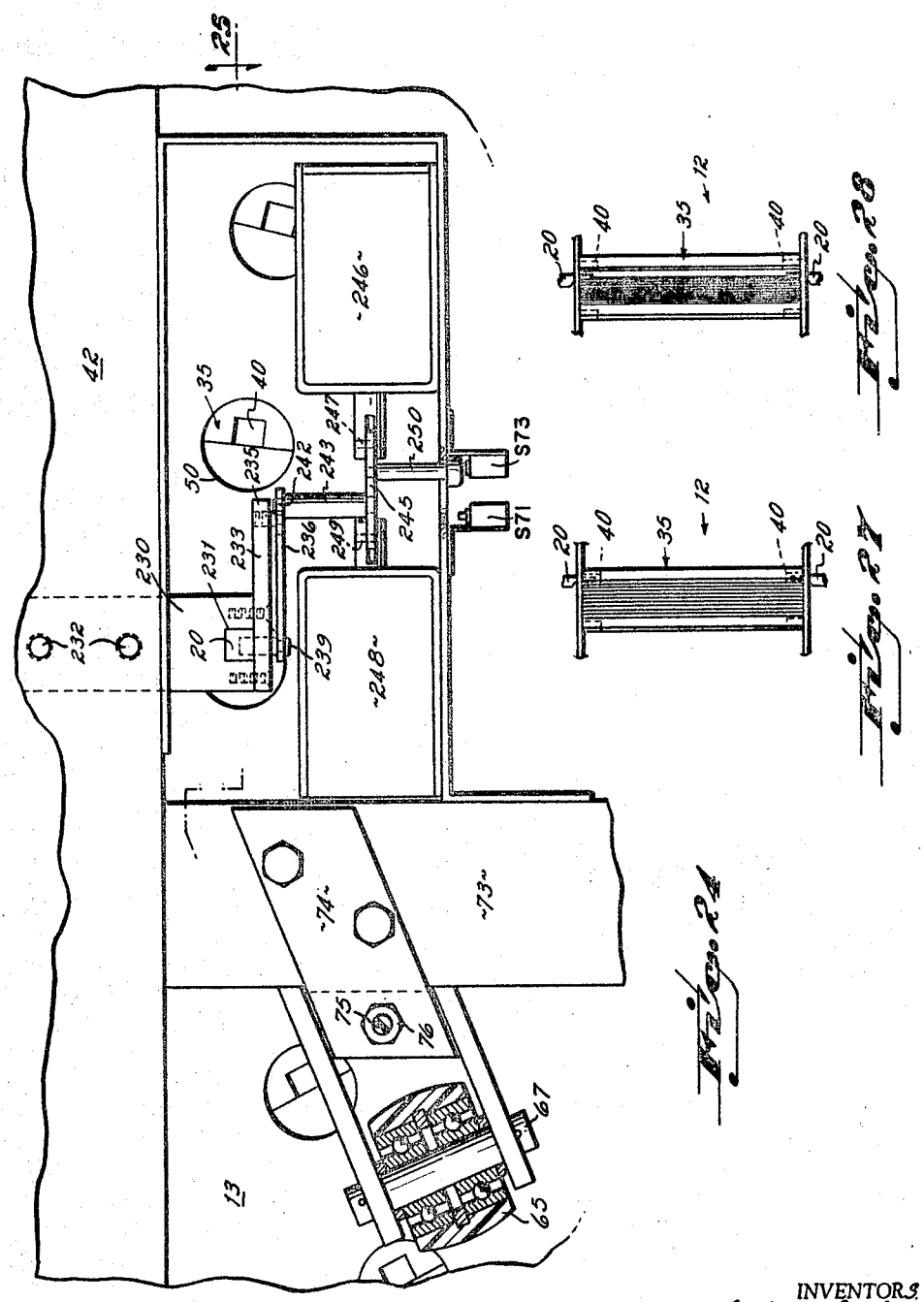

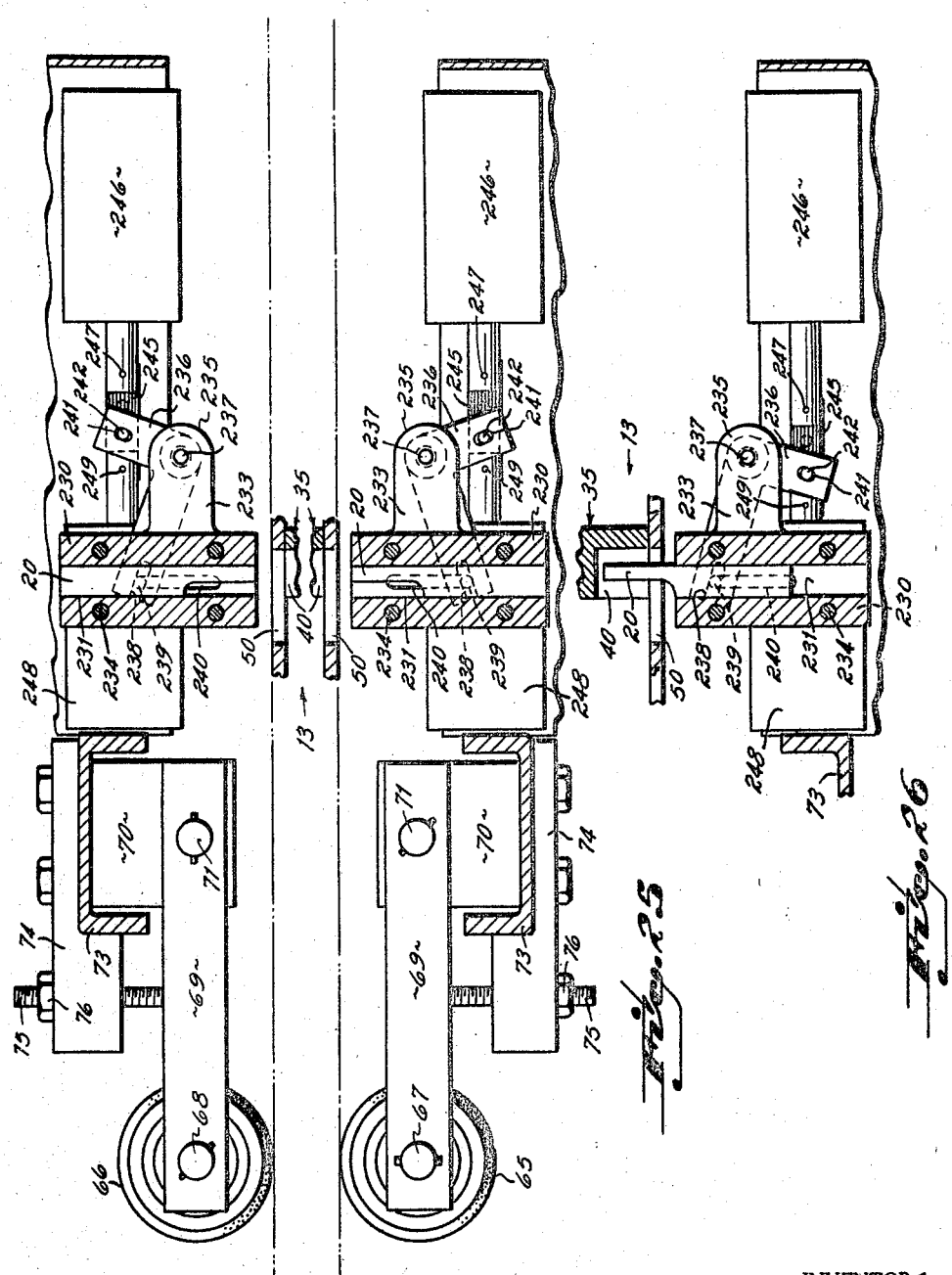

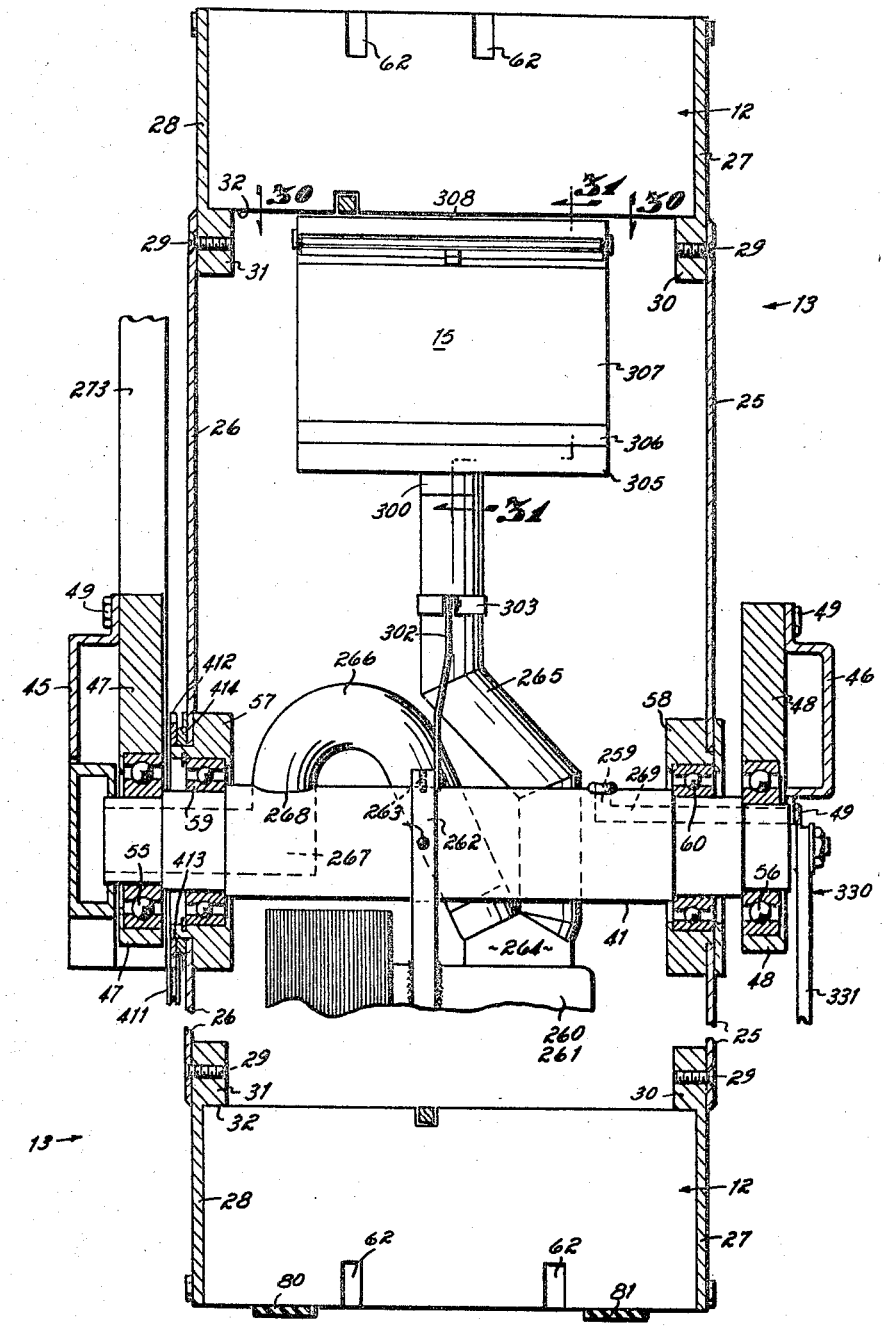

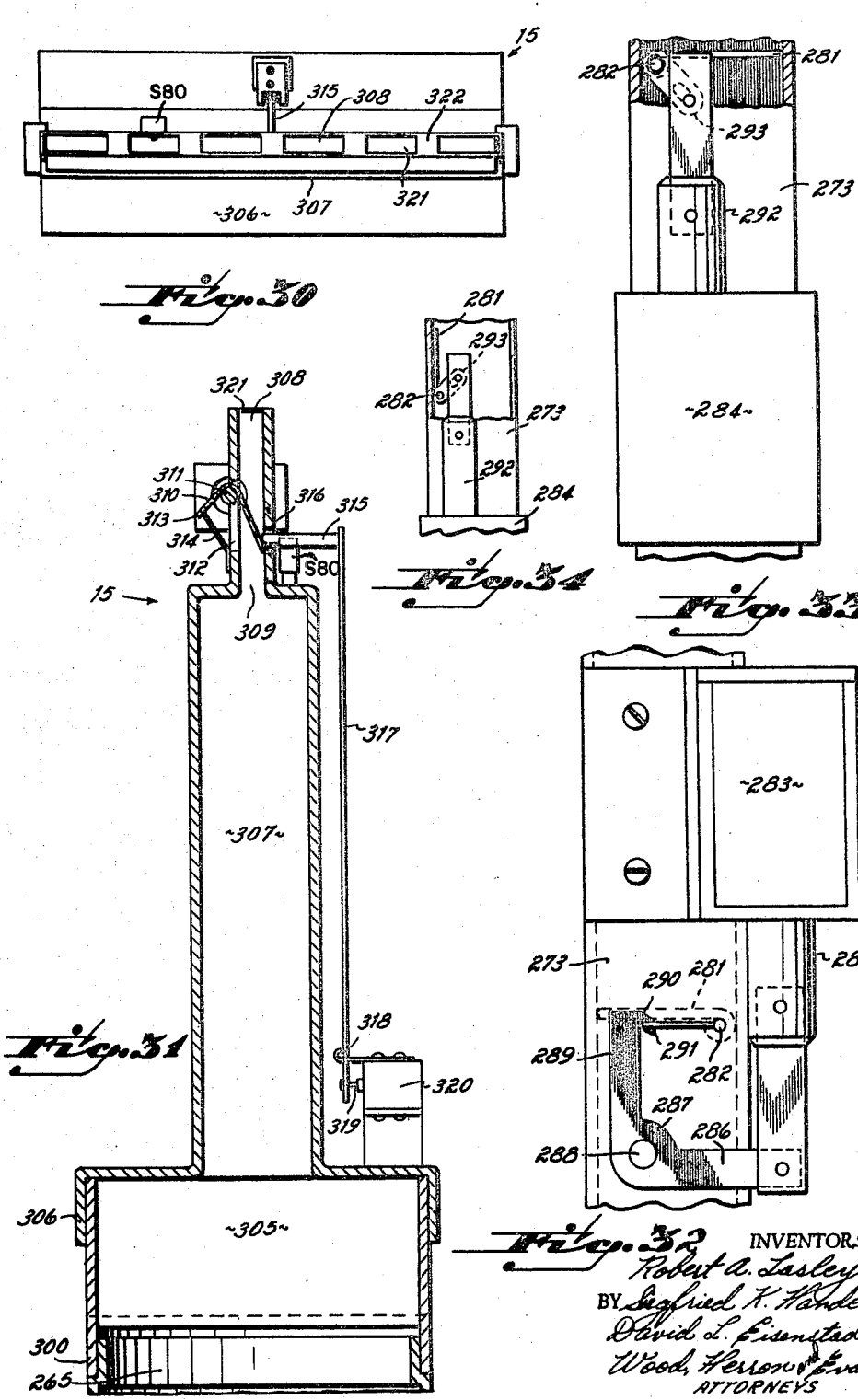

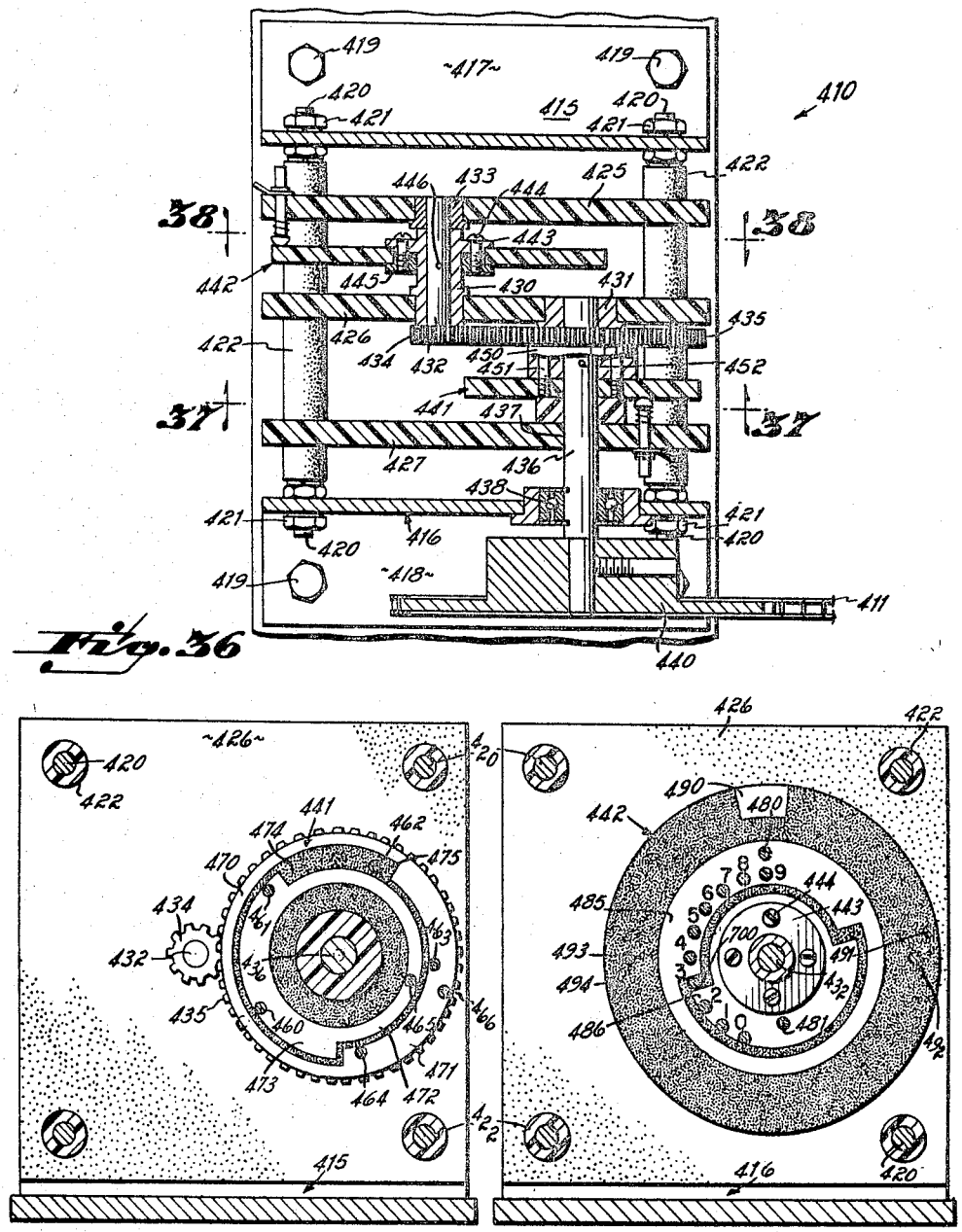

Dec. 28, 1965   R. A. LASLEY ETAL   3,225,925
CARD SELECTING APPARATUS

Filed May 9, 1963   19 Sheets-Sheet 15

INVENTORS
Robert A. Lasley
BY Siegfried K. Handel
David L. Eisenstadt
Wood, Herron & Evans
ATTORNEYS

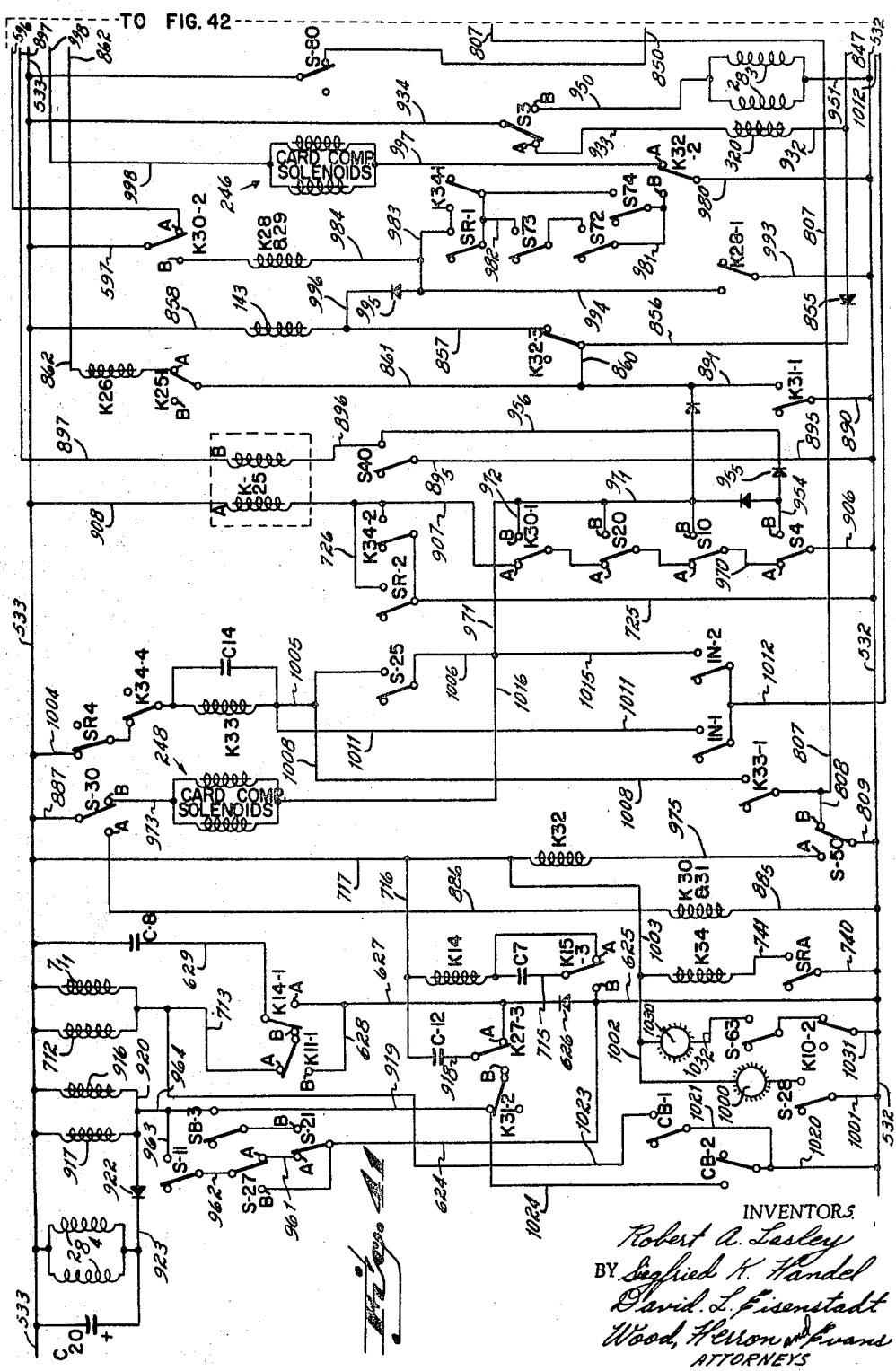

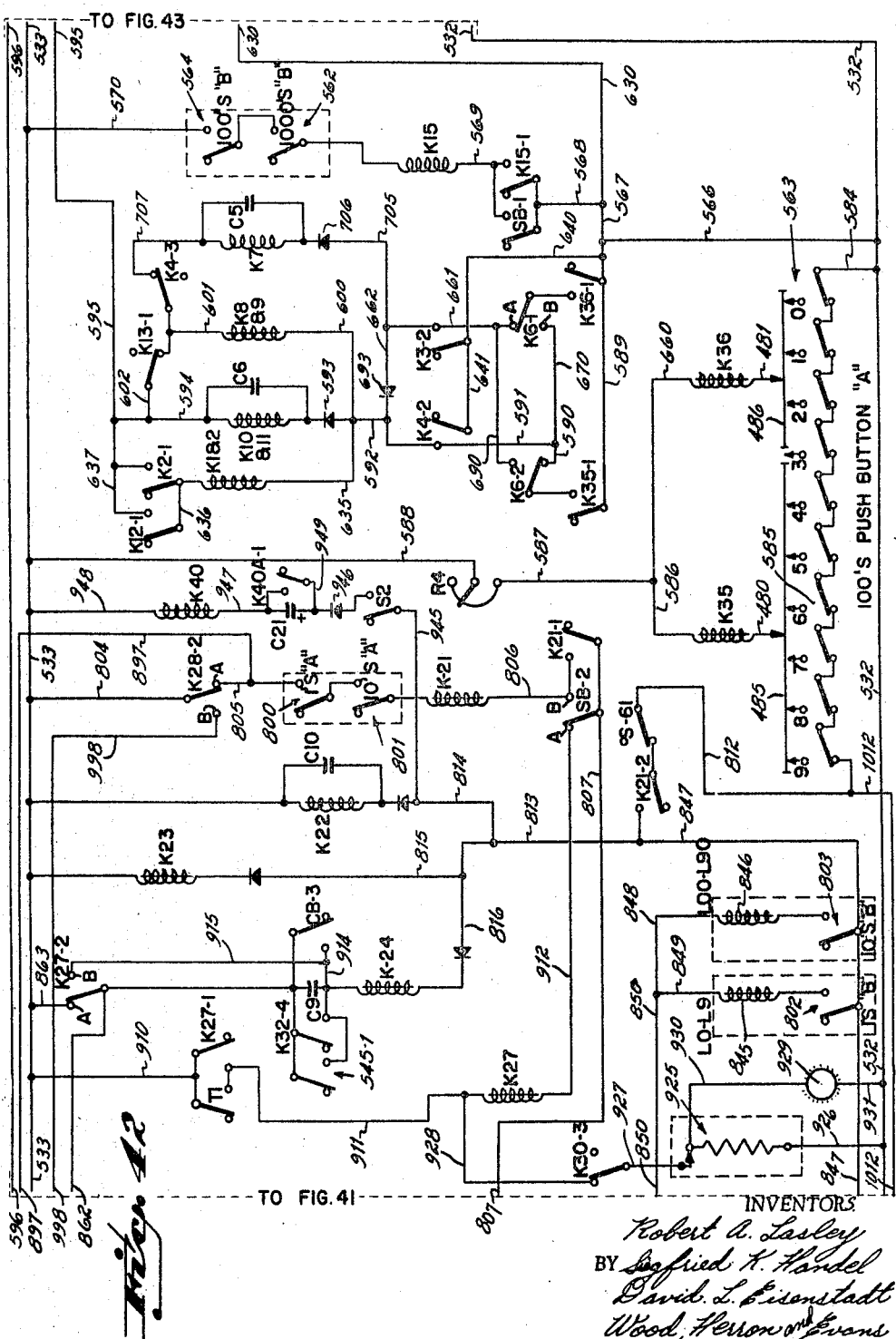

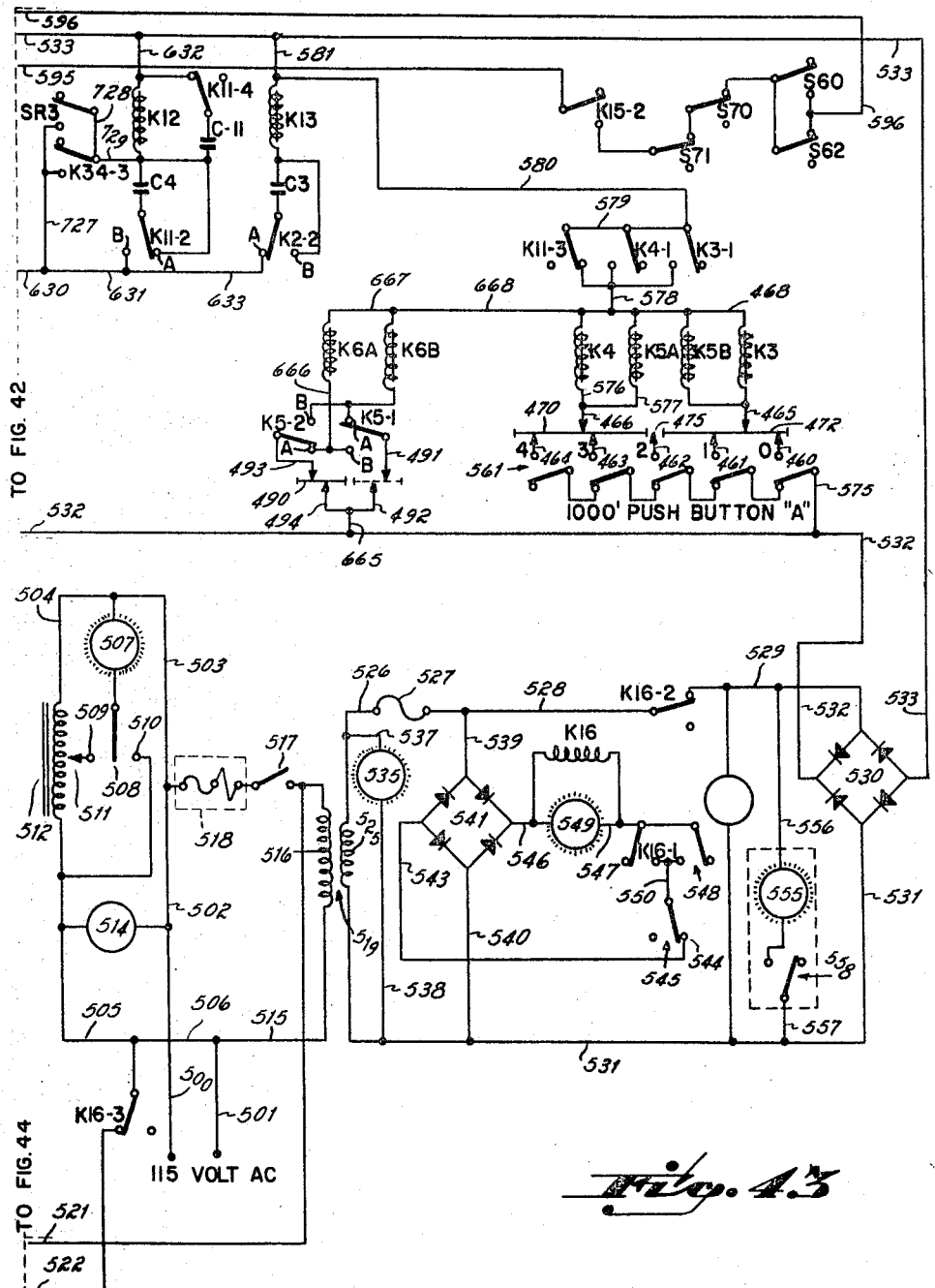

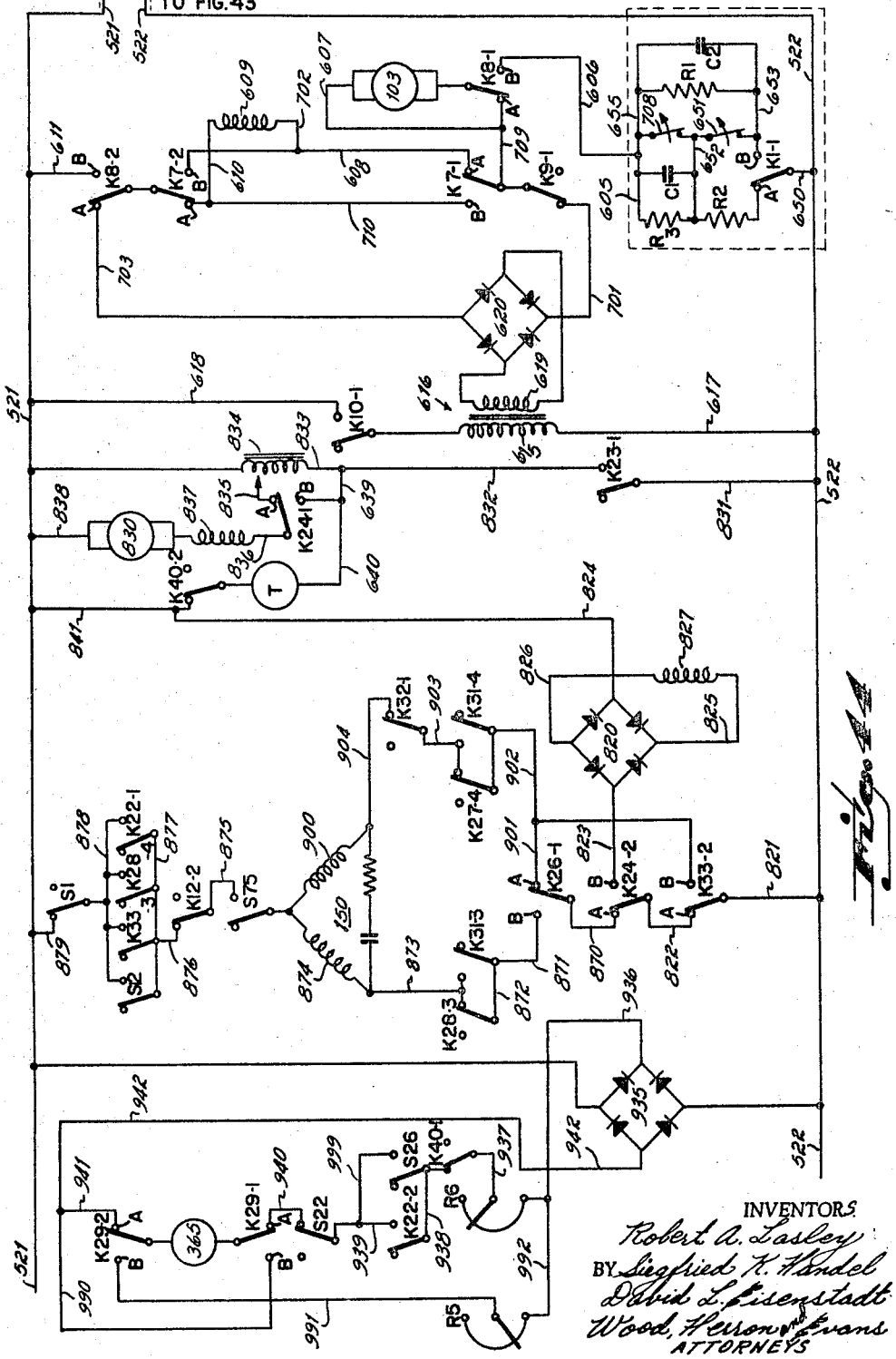

3,225,925
CARD SELECTING APPARATUS
Robert A. Lasley and Siegfried K. Han lel, Hamilton, and David L. Eisenstadt, Cincinnati, Ohio, assignors to Mosler Safe Company, Hamilton, Ohio, a corporation of New York
Filed May 9, 1963, Ser. No. 279,234
8 Claims. (Cl. 209—74)

This invention relates to card selecting systems and more particularly to a card selecting system in which cards are stored in an indexable filing cabinet from and to which cards automatically and selectively are removable and returnable. This application contains subject matter common to an application filed on even date herewith in the names of Warren D. Novak and Robert A. Lasley which is directed to the method and mechanical aspects of the filing system while the present invention pertains primarily to the control system for the retrieval apparatus.

A principal objective of this invention has been to provide a control system for use with card retrieval apparatus and particularly for use in conjunction with card selecting apparatus of the type disclosed in the companion application. To facilitate general understanding of the apparatus with which this control system is particularly adapted to the utilized, its embodiment may be visualized in the form of a plurality of cards arranged facially adjacent one another and in edgewise alignment whereby the cards are in row formation. A card selector mechanism is arranged adjacent the row, for example surmounting the top edges of the cards and the row of cards is movable relative to the selector, such that all cards of the row may be exposed progressively to selection. The cards individually are coded for cooperation with the selector, and means is provided for urging the cards toward the selector as they are scanned by it such that any card of predetermined coding is free to move above the rest of the cards while the other are restrained against such movement. In response to a signal from an operator which designates a predetermined card, the apparatus functions within a matter of seconds to present that card to a position differentiated from the remainder of the cards whereby the operator may remove it manually or it may be removed automatically for inspection or reference.

In one embodiment a card tray in the form of a rotatable filing drum is mounted on a horizontal axis of rotation and provides a plurality of storage pockets or compartments located around its periphery; in this sense therefore the card tray is of the curvilinear type. With a rotatable filing drum having 50 such compartments, approximately 5,000 cards of usual thickness may be stored. The selection station is located at the top of the drum, where the cards rest by gravity, while cards then at lower portions of the drum, which would otherwise fall from it, are held in place by means of one or more belts embracing the lower circumferential drum portions. A tray of this type is disclosed in Knittel Patent No. 2,796,308.

Cards released by the selector for inspector for inspection or retrieval are moved relative to the nonselected cards in the tray by means of a stream of air (or gas) furnished from a nozzle arranged within the drum opposed the selector. While the air ejected from the nozzle against the bottoms of the cards urges all of them progressively toward the selector as the cards are moved relatively past it, a predetermined card, i.e. a card having a code corresponding to the code for which the selector has been set, is free to move relative to the other cards to a position in which it is selectively or removably differentiated from them. From this position the predetermined and now "selected" card may be removed manually, or as is preferred, may be transported to a viewing or read out position.

To facilitate very rapid selection of a card, the invention provides means for indexing the drum via the shortest path and at a fast rate of speed to present the selected compartment to the selector. When the compartment is approximately adjacent the selector, the control mechanism is operable to stop the motor drive system and allow the drum to coast past the selected position. After the drum has been dynamically braked and brought to a stop, the drive system is operable to rotate the drum in the opposite direction at a slow rate of speed to move the selected compartment into alignment with the selector. Thereafter, the air stream is directed against the bottoms of the cards within the selected compartment and the unrestrained preselected card is moved upwardly into a physically discrete position.

After the selected card has been moved into a physically discrete position relative to the remainder of the cards within the pocket, the velocity stream of air is shut off and the selector fingers withdrawn from a restraining position. At this time the selected card is engaged between card transporters which automatically detect its presence and move it to a viewing position. The control system is operative thereafter to automatically move the drum relative to the card transporter to a position preparatory to return of the card to the drum.

One objective of the invention of the present application has been to provide means operative to detect the absence of a preselected card and to signal the machine operator that the card is missing. To this end, the compartment is oscillated relative to the air stream through a selected number of passes after which the drum is moved to its cycle start position and a flashing signal lamp is actuated if the card has not been found.

It has also been an objective of the invention of this present application to provide a control system operable to very accurately control indexing movement of a card carrier to a selected position in a minimum of time and through the shortest possible path from one selected compartment to the selector station. The movement occurs first at a fast rate of speed until the carrier reaches its selected position, after which the carrier coasts to a stop while it is dynamically braked by the driving motor and then is rotated in the opposite direction at a slow rate of speed to the exact final position in which the actual selection is conducted.

Another objective of this invention has been to provide a compact control system operable to accurately control indexing of a heavy drum, card carrier or other type of indexable member by means of a control system utilizing a minimum of mechanical parts. The control system of this invention accomplishes the enumerated movements without the use of any mechanical brakes or clutches and uses as a principal control element a digital control switch. Because there are no clutches and the motor is dynamically brought to a stop rather than mechanically braked, the space requirement for the control system is minimized. Additionally the control switch, because it operates on a digital system, has far fewer contacts than the number of positions to which the drum is indexable. Reduction of the number of contacts materially decreases the space requirement of the switch and the complexity of the control system.

Figure 40:
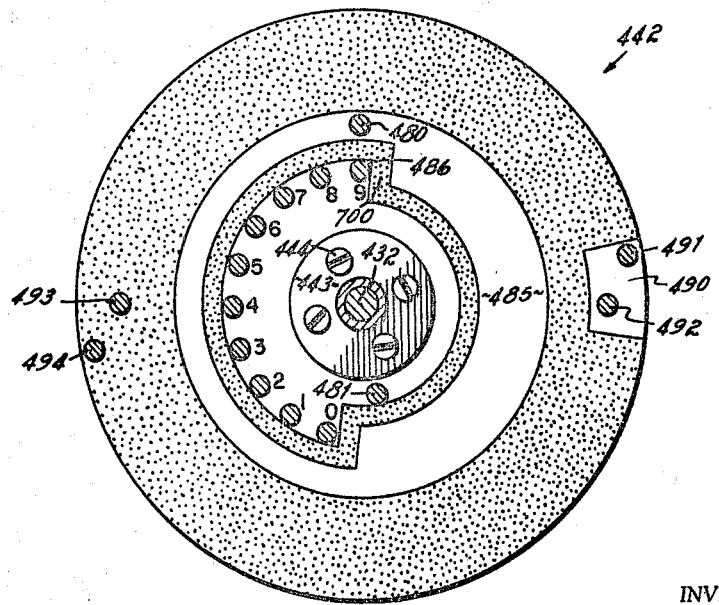

These and other objectives and advantages of the invention will be more readily apparent from a detail description of the drawings in which:

FIGURE 1 is a perspective view of the card selecting apparatus of this invention, FIGURE 2 is a side elevation partially broken away of one side of the machine, FIGURE 3 is a view similar to FIGURE 2 of the opposite side of the machine, FIGURES 4 and 5 are diagrammatic illustrations of a pocket in three different positions relative to the air nozzle illustrating the misalignment which occurs as a result of the fact that all of the cards are not located in radial planes of the drum, FIGURE 6 is a cross sectional view taken along line 6—6 of FIGURE 3, FIGURE 7 is a cross sectional view taken along line 7—7 of FIGURE 6, FIGURE 8 is a diagrammatic illustration of the cams and cam followers of FIGURE 7, FIGURE 9 is a cross sectional view taken along line 9—9 of FIGURE 7, FIGURE 10 is an enlarged view of the drum rocking mechanism shown in FIGURE 3, FIGURE 11 is a cross sectional view taken along line 11—11 of FIGURE 10, FIGURE 12 is a cross sectional view taken along line 12—12 of FIGURE 10, FIGURE 13 is a vertical cross sectional view of the card transport mechanism, FIGURE 14 is a cross sectional view taken along line 14—14 of FIGURE 13, FIGURE 15 is a cross sectional view taken along line 15—15 of FIGURE 13, FIGURE 16 is a cross sectional view taken along line 16—16 of FIGURE 14, FIGURE 17 is a view similar to FIGURE 16 but with the transport mechanism moved forwardly into a bulk-infiling position, FIGURE 18 is a cross sectional view taken along line 18—18 of FIGURE 14, FIGURE 19 is a cross sectional view of a portion of the card transport mechanism illustrated in FIGURE 13 showing the selected card engaged with the selector fingers, FIGURE 20 is a cross sectional view taken along line 20—20 of FIGURE 15, FIGURE 21 is a cross sectional view of a portion of the card transport mechanism illustrated in FIGURE 13 with the card in a partially raised position, FIGURE 22 is a cross sectional view of still another portion of the transport mechanism illustrated in FIGURE 13 with the card located in the fully raised viewing position, FIGURE 23 is a cross sectional view of a portion of the card transport mechanism illustrated in FIGURE 22 with the card stop bar in a position permitting manual removal of the card from the transport mechanism, FIGURE 24 is an enlarged view of the upper portion of the drum and compressor finger mechanism shown in FIGURE 2, FIGURE 25 is a cross sectional view taken along the line 25—25 of FIGURE 24, FIGURE 26 is a cross sectional view of a compressor finger mechanism shown in FIGURE 25 but with the compressor finger located in one of the drum pockets, FIGURE 27 is a diagrammatic view of the card compressor mechanism engaged within the pocket but with the cards not yet compressed, FIGURE 28 is a diagrammatic view of the card compressor fingers engaged in a pocket of the drum with the cards compressed, FIGURE 29 is a cross sectional view taken along line 29—29 of FIGURE 2, FIGURE 30 is a cross sectional view taken along line 30—30 of FIGURE 29, FIGURE 31 is a cross sectional view taken along line 31—31 of FIGURE 29, FIGURE 32 is a cross sectional view taken along line 32—32 of FIGURE 2, FIGURE 33 is a cross sectional view taken along line 33—33 of FIGURE 2, FIGURE 34 is a view similar to FIGURE 33 but with the valve in the open position, FIGURE 35 is a perspective view partially broken away of one card receiving pocket of the drum, FIGURE 36 is a cross sectional view of the selector switch taken along line 36—36 of FIGURE 2, FIGURE 37 is a cross sectional view taken along line 37—37 of FIGURE 36, FIGURE 38 is a cross sectional view taken along line 38—38 of FIGURE 36, FIGURES 39 and 40 are enlarged views of the pocket selection commutator of FIGURE 36 in various rotated positions, FIGURES 41, 42, 43 and 44 are a combined wiring diagram of the card filing system of this invention.

Referring to FIGURES 1, 2, and 3, it will be seen that the card selecting system of this invention consists of a card filing and retrieval system located within a housing 10 and controlled by a console unit 11. The console unit 11 may be mounted within the housing 10 or outside of it as shown in FIGURE 1 depending upon whether remote control is desired.

This system is particularly designed for selection of cards which have coded notches along their upper edges (see FIGURE 35) engageable with selector fingers to prevent all but a selected one of the cards from moving relative to the pack during the card selecting or scanning portion of the operation cycle. The cards are stored within pockets 12 located around the periphery of a drum 13. In a preferred embodiment there are 50 pockets, each of which will contain 100 cards. The cards may carry information printed, written, typed, punched or magnetically coated upon the faces thereof, or may have apertures therein within which are mounted microfilms adapted to be projected onto a screen or viewed via a closed circuit television. In the embodiment illustrated in the drawings the system is equipped with a projecting lamp for projecting microfilm onto a screen or illuminating film for viewing via closed circuit TV. It is to be understood that direct viewing or manual card removal are equally adaptable in this system.

In operation, the drum is rotated so as to locate a pocket having a preselected card therein to the 12:00 or upper position at which the selector mechanism 14 is located. Thereafter the drum is rocked relative to an air nozzle 15 which directs a gaseous stream against the bottom of the cards within the pocket so that the preselected card which is unrestrained against movement within the pocket will be moved upwardly by the air stream between a pair of card transport rollers. At this time the remaining unselected cards in the pack are held down by the selector fingers and thus restrained against movement so that the preselected card is in the position shown in FIGURE 35 after the pocket is scanned. The selector fingers are then withdrawn and the card transported via the card transport mechanism 17 into the viewing position. With the selected card in the transport mechanism and completely out of the drum, the drum returns to its starting position where card compressor fingers 20 enter a gap between the pocket wall and the front card in the pocket and are held in this position while the drum is rotated counterclockwise as viewed in FIGURE 3 to compress the cards within the pocket. Thereafter, upon a signal from the operator, the card drive rollers of the card transport mechanism are rotated in a direction opposite to that in which they were rotated to remove the card from a pocket and the card returned to the gap between the front wall of the pocket and the forwardmost card in the pack. The fingers are withdrawn and the drum returns to its starting or base reference position. Thereafter the cycle may be repeated by selecting the next card at console unit.

While the card selection apparatus has been disclosed as incorporating an indexable compartmented carrier 13 movable relative to the air nozzle 15 and selector mechanism 14 to locate a selected pocket at the card selection station, it should be understood that the objective of this invention may be accomplished by controlling the movement of the selector 14 and air nozzle 15 relative to the card carrier to locate the selected compartment adjacent the card selector mechanism. Numerous engineering factors enter into the determination as to which of the mechanisms will be indexed relative to the other. One such consideration is the weight of the cards stored within the card carrier. The cards alone may weight as much as several hundred pounds depending upon the number, texture, thickness, etc. In a particular application it may be quicker and less expensive to move the selector mechanism and air nozzle relative to the heavier carrier and cards. For example, if the preselected card is to be viewed via a closed circuit television system having a relatively lightweight TV projector, the momentum of the card selector and TV projector may be more easily controlled and quickly maneuvered than the relatively heavy compartmented card storage carrier. On the other hand, if the information on the cards is to be reproduced by a printer movable with and used in conjunction with the selector, the compartmented card carrier may with greater facility be moved relative to the selector. Alternatively, if the speed of card selection is the ultimate consideration, both the carrier and selector mechanism may be moved in opposite directions at slower speeds and with less momentum to be controlled to quickly position the selector mechanism over the selected compartment.

*Card storage drum and drum moving mechanism*

Referring to FIGURE 29, it will be seen that the drum 13 consists of a pair of annular spaced side walls 25, 26 at the radial edge of each of which is located an annular ring 27, 28 respectively. The rings 27, 28 are generally L-shaped in cross section and have the bottom leg attached to the outer edge of the side wall plates 25, 26 by means of a plurality of screws 29. The upper edges of the lower legs 30, 31 of the rings 27, 28 extend upwardly into the space between the side wall plates and serve as supporting surfaces for the lower edges 32 of the cards located within the pockets of the drum.

The pockets of the drum are formed by spaced divider walls 35 which extend transversely between the annular rings 27, 28. In cross section each wall is of increasing thickness in a direction extending outwardly from the center of the drum so that the pocket formed by the rear wall of one block and the forward wall of the adjacent block is rectangular in cross section. The outer edge of each block is beveled as at 37 to provide a tapered guide surface for cards as they are returned to the pocket.

Each pocket is preferably equipped with a compressor plate 38 (see FIGURE 35) which is spring biased by means of an elliptical spring 39 toward one transverse wall of the pocket. This spring serves to maintain the cards within a pocket under mild compression and thus avoids angular disposition of one card relative to the others.

Each divider wall 35 has a pair of compressor finger receiving notches 40 along its inside edge surface which permit entry of the compressor fingers between the dividing block and the forwardmost card. These notches permit the entry of compressor fingers 20 into this area. The compressor fingers 20 serve to push the deck of cards rearwardly against the bias of the spring 39 prior to the return of a card to the pocket.

The drum 13 has a plurality of compressor finger receiving apertures 50 equally spaced around the annular rings 27, 28. During that portion of the cycle when the deck is compressed, the compression fingers 20 enter these apertures and are received within the recesses 40 in the divider walls 35. The drum 13 is then rotated through a slight angle to compress the deck for reinsertion of the card.

The rotatable drum 13 is mounted upon a shaft 41 which in turn is supported by a frame indicated generally by the numeral 42. Frame 42 consists of two rectangular sections 43, 44 interconnected by cross pieces (not shown). The frame is enclosed by the housing 10. Extending along both sides of the frame in the horizontal plane are a pair of generally hat-shaped channels 45, 46 which are welded or otherwise secured to the rectangular frame sections 43, 44 respectively. Depending axle supporting brackets 47, 48 are attached to each of the channel members 45, 46 by means of a plurality of bolts 49. The ends of the drum supporting axle 41 are supported within apertures in brackets 47, 48. Antifriction roller bearings 55, 56 are located between the brackets and the axle 41. These bearings 55, 56 permit the axle to be oscillated slightly during the card scanning operation as is more fully explained hereinafter.

The card storing drum 13 is rotatably mounted on the axle 41. It is secured thereto by means of annular rings 57, 58 rigidly attached to the side wall plates 25, 26 respectively. Roller bearings 59 and 60 are located between the mounting rings 57, 58 and the axle 41 so as to permit the drum to be rotated relative to the axle 41 with a minimum of friction during the pocket selection portion of the operating cycle.

Because of the criticality of alignment between the card notches 62 and the selector fingers which determine which card is to be selected, it is important that the axial drum position be maintained very accurately relative to the frame. To this end, this system incorporates a pair of adjustable guide rollers 65, 66 located on either side of the drum adjacent the selector station. Each guide roller 65, 66 is mounted upon an axle 67, 68 respectively, which is in turn journalled within supporting brackets 69 (see FIGURES 2 and 25). The brackets 69 are in turn pivotally attached to a supporting block 70 by means of a pivot shaft 71. The supporting blocks 70 are bolted or otherwise secured to a vertical support 73 rigidly connected between the horizontal hat-shaped channel 45 and the rectangular upper frame member 43. A horizontally extending bracket 74 is also bolted to the vertical frame member 73 in the plane of the guide rollers and has a threaded aperture extending therethrough through which is threaded an adjusting screw 75. By rotating the adjusting screws 75 in opposite directions the drum may be moved axially relative to the frame and aligned with the selector fingers. After correct alignment has been attained the adjusting screw 75 may be locked in position by means of lock nuts 76.

As shown in FIGURES 2, 3 and 29, card storage drum 13 is driven in rotation by a pair of endless card retainer belts 80, 81. The belts engage the cards through an arc of approximately 270° of rotation of the drum and disengage the cards during the upper 90° of the arc. Movement of the belt is transferred frictionally to the drum and causes it to rotate. Belts 80, 81 are supported upon pairs of idler pulleys 82, 83, 84, 85 and 86 which are in turn rotatably mounted upon stationary brackets 87, 88, 89, 90 and 91 respectively. Each of these brackets is rigidly mounted upon the frame 42 as by welding or other rigid attachment means. In addition belts 80, 81 pass under a pair of slack take-up pulleys 92, rotatably mounted upon a movable bracket 93. Bracket 93 is linearly movable within a dove tail slideway in frame member 42 and is adjustable by means of a screw 94 which is threaded through a stationary block 95 and abuts against a portion of the bracket 93. Upon rotation of screw 94 the bracket is caused to move toward or away from the stationary block 95.

Movement of the belts is imparted from either of two sources depending upon whether the drum is being rotated from one pocket to another or moved from one position in the pocket to another during the scanning operation. During rotation from one pocket to another the drum rotates at a much greater speed than during scanning when the drum is merely rocked or oscillated so as to move the drum a finite distance relative to the air nozzle. For this reason the belts 80, 81 pass beneath rocker arm assembly pulleys 100, around motor pulleys 101 and under rocker arm assembly pulleys 102. The drum is driven in rotation for movement from one pocket to another by rotation of motor pulleys 101 which are driven by a reversible electric motor 103. It is oscillated or rocked during the scanning operation as a result of oscillation of the rocker arm assembly 104 about the axis 141 of the motor pulleys 101.

Main drive motor 103 drives pulleys 101 through a conventional gear reduction box 99 which has two outut shafts 105, 106 to which the pulleys are nonrotatably keyed by a pair of keys 107, 108 respectively. Thus, when main drive motor 103 is driven in rotation, the pulleys 101 cause movement of the belts 80, 81 and consequent rotational movement of the card containing drum 13.

The rocker arm assembly 104 is mounted for oscillatory movement upon the ends of output shafts 105 and 106 of gear reduction unit 99. The rocker arm assembly 104 consists of a pair of end plates 111, 112 welded to a tubular spacing member 113. The pulleys 100, 102 are rotatably mounted upon supporting shafts 115. The shafts 115 are supported at one end by the end plates 111, 112 and at the other end by brackets 116, 117 welded to the tubular spacer member 113 (see FIGURES 11 and 12). Roller bearings 120 are interposed between the pulleys and the shafts 115. The pulleys are restrained against lateral movement by spacer sleeves 121.

The end bracket 112 is bolted to a pivot plate 125 which is rotatably journalled on the end of output shaft 105. A roller bearing 126 is interposed between these two members to reduce friction. In like manner the end plate 111 is bolted to a pivot plate 124 rotatably journalled on the end of output shaft 106 of gear reduction unit 99. Referring to FIGURE 10, it will be seen that the pivot plate 124 has an upstanding arm section 127 by means of which the pivot plate 124 and the connected rocker assembly is caused to oscillate as is more fully explained hereinafter.

Also bolted to pivot plate 124 is a rocker plate 130 by means of which oscillatory movement of the rocker arm assembly is transferred through an appropriate linkage system to the air nozzle so as to cause slight oscillatory movement of the air nozzle during scanning movement of the card supporting pockets as is more fully explained hereinafter. This oscillatory movement of the air nozzle functions to compensate for misalignment of the cards and the air nozzle 15.

The rocker arm assembly 104 is oscillated only during the pocket scanning portion of the machine cycle. To prevent movement of the rocker arm during the pocket selection operation an electrically actuated interlock 135 is provided. This interlock consists of a lock plate 136 pivotally mounted upon the base of the frame (see FIGURES 10 and 11) and having an aperture 137 movable over a protrusion 138 of the tubular member 113. Welded to locking plate 136 is an upstanding flange section 139. A compression spring 140 is attached at one end to the base of the frame and at the opposite end to flange 139 so that the spring normally biases the locking plate 136 into engagement with the tubular member 113 over protrusion 138. In this position the rocker arm assembly 104 is held or restrained against rotation about axis 141 of the output shafts 105, 106. The end of the flange 139 is also attached to actuator arm 142 of solenoid 143 so that upon energization of solenoid 143, flange 139 is pulled outwardly away from the frame and lock plate 136 is moved out of engagement with protrusion 138. Thus when solenoid 143 is energized the rocker arm assembly 104 is free to oscillate or pivot about the axis 141.

*Drum pocket scanning drive system*

After the drum is rotated to a position in which the selected pocket containing the preselected card is in the 12:00 or scanning position (as shown in FIGURE 3) the drum is rotated through a small arc relative to the nozzle 15. Assuming that the drum contains 50 pockets as in the preferred embodiment, the drum is rotated through an arc of approximately 7° in the counterclockwise direction. To avoid the possibility of a card being inadvertently missed during the pass of the card by the air nozzle or through the air stream, multiple passes are preferred. Thus, the drum is rotated first 7° in the counterclockwise direction as viewed in FIGURE 3 and then 7° in the clockwise direction. This gives a multiple scanning cycle, i.e. the preselected card passes through the air jet several times so as to preclude any possibility of a card being missed if it does not move relative to the pack during the first pass of the drum past the air nozzle. The drum is rocked through this 7° arc as a result of linear movement of the belt derived from arcuate movement of the rocker arm assembly 104 about the axis 141. Referring to FIGURE 10, it will be seen that as the rocker arm assembly 104 is pivoted in the counterclockwise direction, the sections of the belts 80, 81 to the left of pulley 100 will be pulled downwardly while the portions of the belts to the right of pulley 100 will be moved to the right or relaxed and this belt movement will be translated into counterclockwise rotation of the drum by contact of the belts 80, 81 with the drum. Rotation of the rocker arm assembly in the scanning cycle movement of the drum is derived from an electric motor 150 acting through a pair of control cams 151, 152 and a linkage system 153 attached to the arm 127 of pivot plate 124.

The output shaft 155 of motor 150 is nonrotatably keyed to the control cams 151, 152 by lock pin 156 so that the cams rotate with the motor. Referring to FIGURES 6 and 7, it will be seen that a cam follower 157 is engageable with the peripheral edge of cam 151 and follows its contour. Cam follower 157 is a ball bearing raceway rotatably mounted upon a bolt 158. The bolt 158 also has a spacer sleeve 159 journalled thereon over which is mounted a cam follower arm 160. Also mounted on bolt 158 is a bearing 161 upon which the linkage member 153 is journalled. The opposite end of linkage member 153 is journalled on pin 162 which is press-fit into an aperture in the arm 127 of pivot plate 124. Link 153 is secured on pin 162 by a nut 163. The cam follower 157, spacer sleeve 159, and bearing 161 are held in assembled relation on the bolt 158 by means of a hex-head nut 164.

A cam follower 170 in the form of a bearing raceway is also mounted so as to follow the contour of cam 152. Cam follower 170 is journalled upon cam follower pin 171 which is press-fit into an aperture 172 of a cam follower arm 173. Cam follower 170 is also held in assembled relation on the cam follower pin 170 by a conventional hex-head nut 174 threaded onto the threaded end 175 of the pin 171.

Both of the cam follower arms 160, 173 are pivotally mounted on a bracket 180 rigidly attached to the frame 42. The pivotal mounting consists of a nut and bolt 181 (see FIGURES 7 and 9) which extends between the yoke sections of the bifurcated bracket 180. Both arms have cut out sections 183, 184 adjacent their lower ends which permit the upper sections of the arms to be located in the same vertical plane. Both have an aperture at their lower ends for mounting on the bolt 181 about which they pivot. A bearing sleeve 185 is mounted upon bolt 181. Cam follower arm 160 is rotatably journalled upon this bearing sleeve 185 while cam follower arm 173 is rotatably journalled upon a second bearing sleeve 186 which extends between the inside edge of arm 160 and one yoke section of the bracket 180. Bearing sleeve 186 thus functions as a spacer sleeve as well as a bearing. A nut 187 secures the bearing sleeves and bolt 181 in assembled relation.

The upper end of each cam follower arm 160, 173 has an upstanding pin 191 between which extends a compression spring 192. The spring 192 biases the two cam follower arms 160, 173, toward each other about the pivot point 181 so as to maintain the cam followers 157, 170 in close proximity to engagement with the control cams 151 and 152 respectively. The spring 192 acts as a safety device during the card deck compression in that if the compressor fingers hit the end of the cut out hole in the drum side before the fully compressed position is reached, the spring spreads or extends and there is no damage to the equipment.

Adjacent its lower end, arm 160 has a threaded aperture 193 within which is mounted a threaded screw 194. One end of screw 194 engages a flat surface 195 on a protrusion 196 welded to the inside edge of cam follower arm 173. By rotating screw 194 the angle between arms 160 and 173 may be varied. Thus this screw serves as an adjustment for varying the clearance between the control cams 151 and 152 and the cam followers 157 and 170, respectively. It thus prevents a binding force between these elements which might otherwise tend to cause excessive wear of the roller bearings which constitute the cam followers. Additionally, this arrangement reduces the power requirement of the motor to rotate the drum since no spring force need ordinarily be overcome. In this connection it should be noted that the control cams 151 and 152 are mirror image cams which are so contoured as to maintain a fixed distance between the axes of cam follower 157 and follower 170. Thus these followers move in an arcuate path about the pivot 181 while remaining a fixed distance apart.

Also rigidly mounted on the frame 42 adjacent the bracket 180, is a microswitch mounting bracket 200 at the upper end of which is attached microswitch 201. Bracket 200 extends at an angle generally parallel to cam follower arm 160 from the base of the frame. The bracket 200 supports a microswitch S30. The actuator 202 of switch S30 extends outwardly from the body of the switch to a position in which it is engageable with one edge 203 of the arm 160 at one limit of the arm movement. When the switch is engaged with the actuator 202 of switch S30, the drum is in its No. 1 or starting position ready to commence a card selection cycle.

Also mounted upon the frame 44 in a position adjacent the scanning drive motor 150 are a pair of microswitches S40 and S50. The actuators 207 and 208 of the switches S40, S50, respectively are mounted in the horizontal plane of a switch actuator blade 210 mounted on the end of the motor shaft 155. These switches S40 and S50 in conjunction with switch S30 control the direction of rotation of scanning motor 150.

Referring to FIGURES 3 and 7, the scanning motor 150 and its connecting linkage are shown in the scanning cycle start or No. 1 position. Upon initiation of the scanning cycle, motor shaft 155 and the cams 151, 152 rotate in the clockwise direction until the switch actuator blade 210 (shown in phantom in FIGURE 7) engages the switch actuator 207 of switch S40 at position No. 2. Closing the switch S40 causes reversal of scanning motor 150 which then rotates in the counterclockwise direction until switch actuator blade 210 is in position No. 1 shown in phantom in FIGURE 7. In this position cam follower arm 160 engages switch actuator 202 of switch S30 causing this switch to close a second set of contacts again reversing the direction of rotation of motor 150. This cycle will be repeated until either the selected card is found and enters the card transport mechanism 17 or a timer stops the cycle.

As the cam 151 rotates in the clockwise direction through an arc of 150°, cam follower 157 moves to the right as shown in FIGURES 7 and 8. Since the distance between cam followers 157 and 170 is fixed, cam follower 170 also moves to the right during this 150° of clockwise rotation. During counterclockwise rotation of the cams from the No. 2 position to the No. 1 position, the cam followers move to the left as viewed in FIGURE 7. This rocking or oscillatory movement of the cam follower arms 160, 173 is translated into reciprocal movement of linkage arm 153 and consequently oscillatory movement of the drum 13 through an arc of approximately 7° in first the counterclockwise direction, then the clockwise direction. Thus all the cards in a selected pocket are exposed to plural passes by the air nozzle. If at the end of a preselected number of passes as determined by a timer, no card has been moved upwardly by the air stream issuing from the air nozzle, the cycle is stopped at the No. 1 position and a card missing flasher light is energized as is more fully explained hereinafter in connection with the wiring diagram. On the other hand, when a card is found it moves between the rollers of the transport mechanism 17 as it is ejected to a physically differentiated position by the air stream. The drum is then automatically rotated to its card return or zero position as is also explained later in connection with the wiring diagram.

In order to insure that the preselected card is quickly returned to the drum without interferences of the other cards in the pocket or the drum divider walls, the preferred embodiment of the selecting mechanism incorporates means to compress the deck of cards within a pocket so as to provide a large space between the first card in the dock and the adjacent drum divider wall 35. The removed or preselected card is then infiled or returned to this space after the information has been used by the machine operator or reader. To this end, this machine incorporates a pair of electrically operated card compressor fingers 20 which upon ejection of the preselected card from the file and movement of the file to the No. 1 or starting position pass through the apertures 50 in the side walls of the drum and enter the recesses 40 in the drum divider walls 35.

Referring to FIGURES 24 through 28, it will be seen that the compressor fingers 20 are slidably mounted within a rectangular groove 231 in block 230. The block 230 is rigidly attached to the frame 42 by screws 230. The compression fingers 20 are retained within the recess 231 by means of a retainer bracket 233 mounted on the bottom of the block 230 by screws 234. The bracket 233 has a flange 235 extending outwardly in the horizontal plane upon which a compressor finger actuating bell crank 236 is mounted. The bell crank 236 is pivotally mounted upon a pin 237. One leg of the crank 236 is longitudinally slotted as at 238 to accommodate a pin 239 depending from each compressor finger 20 and extending through a longitudinal slot 240 of bracket 233. The other leg of the crank 236 has a longitudinal slot 241 therein which accommodates one end 242 of a connecting pin 243. The opposite end of the pin 243 is mounted in a connecting link 245 which is attached at one end to solenoid 246 by pin 247 and is attached at the opposite end to solenoid 248 by pin 249. Depending from link 245 is a switch actuating pin 250 operable to actuate either of two switches S71 or S73 depending upon the position of the card compression fingers 20. A similar pair of compressor finger actuated switches S70 and S72 are mounted upon the opposite side of the drum.

As should now be obvious, upon energization of solenoid 246, link 245 is moved to the right as viewed in FIGURE 26 which results in bell crank 236 being pivoted in the counterclockwise direction and movement of the compression fingers outwardly. Energization of solenoid 248 results in movement of the connecting link 245 to the left with resulting clockwise movement of the bell crank and movement of the compression fingers into the drum.

After the card compression fingers 20 move into the recesses 40 of the partitions between the pockets of the drum and prior to the return of the card to the pocket by the card transport mechanism 17, switches S70 and S71 close indicating that the compressor fingers are extending into the drum. At this time scanning motor 150 is caused to rotate in the counterclockwise direction as viewed in FIGURE 7 from the No. 1 position to the zero or cards compressed position until the switch actuator finger 210 engages the switch actuator 208 of switch S50. This movement of the scanning motor in the counterclockwise direction drives the drum 13 in the counterclockwise direction as viewed in FIGURE 3 by means of the connecting linkage 153 and belts 80, 81. At this time the cards within the selected pocket are restrained against movement by the card compressor fingers 20 so that a gap is established between the divider wall 35 and the other cards of the deck in the preselected pocket. The drum rotates through an arc of approximately 3° during this card compression portion of the cycle as the switch actuator blade 210 moves from the zero position (shown in phantom in FIGURE 7) to a position in which it engages the actuator 208 of switch S50. Closing of switch S50 readies a drive roll motor 365 circuit of the card transport mechanism 17 for return of the selected card to the file. Entry of the card into the pocket of the drum closes a switch mounted on the card transport mechanism as is more fully explained hereinafter resulting in energization of solenoids 246. Energization of solenoids 246 causes the card compressor fingers 20 to be withdrawn from the drum. Simultaneously, the scanning motor 150 is energized driving the cams 151, 152 in the counterclockwise direction as viewed in FIGURE 7. This results in the card carrying drum 13 moving in the clockwise direction until the cam follower arm 160 contacts the switch actuator 202 of switch S30. In this position, the drum is in its starting or No. 1 position ready for initiation of another cycle upon selection of another card at the console member 11.

In order to prevent the card compressor fingers 20 from being inadvertently broken off or damaged in the event that excessive force is applied during the card compression portion of the cycle, the force operative to rotate the drum during card compression is applied through resilient means. Thus in the event that undue force is encountered by the compressor fingers, the drum will discontinue rotation even though the scanning motor continues to rotate in the counterclockwise direction as viewed in FIGURE 7. An example of a situation in which an excessive force might be applied to the compressor fingers 20 would occur if the cards within the selected pocket were of greater thickness than anticipated. Since the manufacturer of this machine is not able to control the thickness of the cards supplied to the user of the machine, this slippage in the drive during card compression is desirable. During clockwise rotation of the cams, the cam follower arms 160, 173 move about the pivot 181 in the clockwise direction. At this time linkage arm 153 is pulled to the right as a result of the follower arm 160 being pulled to the right by spring 192. Thus as the drum rotates in the counterclockwise direction during the card compression portion of the cycle, the force tending to move the drum is derived from clockwise movement of the cam follower arm 173 applied through the resilient spring 192. In the event that an excessive force is applied to the card compression fingers 20 or the drum is somehow restrained against movement, the fingers will not be broken off but rather the spring 192 will yield so that the cam follower arms 160, 173 will move apart. Thus an obstruction to movement of the drum in the counterclockwise direction during the scanning portion of the machine cycle will not cause the machine to be broken but rather will only result in a tensioning of the spring 192.

Referring to FIGURES 3 and 29, it will be seen that the motor driven air compressor 260 and connecting ductwork to the nozzle 15 are mounted within the interior of drum 13 so as to utilize the available space within the interior of the drum to maximum advantage. The compressor and the electric motor which drives it are both mounted within a housing 261 welded or otherwise secured to a bracket 262. The bracket 262 is in turn adjustably mounted upon shaft 41 for rotation with the shaft. For purposes of adjustment of the bracket relative to the shaft, a pair of set screws 263 are provided. The air compressor outlet 264 is rigidly connected to a pair of conduits 265 and 266 to the air nozzle 15 and to an air duct 267 in the shaft 41. The air duct 267 in the shaft 41 extends axially from one end of the shaft to a radial outlet 268 within which the conduit 266 is mounted. The opposite end of the shaft 41 is provided with an axial aperture 259 which connects with a radially extending hole 270 through which extend the electrical leads from a power source to the compressor driving motor within the casing 261.

Air pumped by the compressor 260 through the duct 267 in the shaft is utilized to prevent doubles or more than one card from inadvertently being pulled by the transport mechanism 17 out of the selected pocket of the drum. In the absence of some means for preventing doubles from being withdrawn from the pocket, there is a tendency after the selector fingers have been disengaged from the cards, for those cards, adjacent the card which has been selected to adhere as a result of surface tension to the preselected card as it is moved by the rollers of the transport mechanism into the viewing station. To avoid this problem and break the surface adhesion of adjacent cards with the preselected card, this machine incorporates a pair of nozzle outlets 274, 275 directed at the point of entry of the selected card between the rollers of the transport mechanism (see FIGURE 20). As shown in FIGURE 2, air is conveyed from the air outlet 267 in the shaft 41 to the doubles prevention air nozzles 270, 271 (FIGURE 20) via a pair of conduits 272, 273.

With the nozzle outlets 274, 275 directed downwardly at opposite sides of the card, the inadvertent exposure of two cards or a double in the transport mechanism is avoided. During the scanning cycle when the air stream is directed against the bottom of the cards in the pocket, all of the cards in the pocket except the preselected one having the proper coded notches along its upper edge, are restrained against movement by the selector fingers 280 of the selector mechanism 14. After the preselected card has been raised into the position shown in FIGURE 20 in which it is located between the lower drive rollers, the air supply to the air nozzle 15 is closed off and the selector fingers withdrawn from a restraining position over the pack of cards in the selected pocket. If the air supply was left on at this time the air stream would force all of the cards up toward the rollers and several through or between them. Simultaneously the air supply to the doubles prevention nozzles 270, 271 is opened. The card transport mechanism motor 365 is then re-energized and causes the rollers 276, 277, 375 and 389 to rotate in the proper direction to drive the card upwardly in the card transport mechanism 17 to the viewing position or other equipment.

Referring to FIGURES 2, 32, 33 and 34, it will be seen that the means for opening and closing the air supply to the doubles prevention air nozzles 270, 271 consist of a pair of valves, one of which is mounted within each of the conduits 272, 273. Since these valves and their operating mechanisms are identical, the one in duct 273 will be described in detail although it should be understood that a similar valve is mounted in duct 272. Each valve consists of a movable air cutoff plate 281 rigidly connected to a pivot shaft 282 which extends through and is journalled in the side walls of the duct 273. Movement of shaft 282 and thus the air cutoff plate 281 attached thereto is controlled by a pair of solenoids 283, 284 mounted on the outside of the duct 273. When a preselected card is moved between the card transport rollers 276, 277, 375 and 389 by the air stream issuing from the air nozzle 15, a switch on the card transport mechanism closes to energize solenoids 283. Energization of solenoid 283 causes the solenoid armature 285 to move upwardly carrying with it one arm 286 of a bell crank latch 287 pivotally mounted upon shaft 288. This results in counterclockwise rotation of the bell crank latch 289 which disengages a rounded nose section 290 from a latch pin 291. At this time air from the blower which has been started at the start of the machine cycle forces the plate 281 upwardly to the open position. When the preselected card enters the viewing position in the card transport mechanism 17, it closes an appropriate switch on that mechanism as described hereinafter in connection with the machine control circuit and causes cutoff plate 281 to close. To close the cutoff plate, the solenoid 284 is energized causing its armature 292 to move downwardly, pulling with it a link 293 rigidly attached to the shaft 282 upon which the plate 281 is mounted. As the plate 281 rotates into the closed position, the latch pin 291 moves past the nose section 290 of the bell crank latch 289 into the locked position beneath the nose.

Referring to FIGURES 29, 30, 31, it will be seen that the air nozzle 15 is generally rectangular in shape and has a depending flange portion 306 which fits over a rectangular section of a nozzle mounting fixture 305. The nozzle mount 305 in turn has a depending circular flange portion 300 which fits over the air supply conduit 265 so that the nozzle is mounted upon the conduit 265. Conduit 265 is in turn rigidly attached to the bracket 262 by a bracket 302 and collar 303 so that the air nozzle rotates with the shaft 41 and blower housing 260.

As shown in FIGURE 31, the nozzle has three different thicknesses so that it is wide in the area of the flange 306, thinner in the middle section 307 and has a small rectangular orifice or air outlet end 308. Mounted in the upper or air outlet section 308 is a quick acting air cutoff valve 309. This valve is very quick acting so as to immediately close off the air supply issuing from the nozzle as soon as the preselected card enters the rollers 276, 277, 375 and 389. Without the valve the selector fingers could not be withdrawn and the card transported to the viewing position until the air blower and motor coasted to a stop. This would involve approximately eight seconds. However, with this quick acting valve, the air supply may be cut off within a fraction of a second after the card enters the rollers so that the rollers may be rotating at the time the card enters and continue to rotate at the same speed and withdraw the card without even slowing the roller rotation.

The air cutoff valve 309 consists of an L-shaped air cutoff plate 310 mounted upon a pivot plate 311 extending along the top of a slot 312 in one side of the air outlet section 308 of the nozzle. The plate 310 and mounting pin 311 extend the complete length of the nozzle 15 so as to completely shut off or open the nozzle depending upon the position of the plate. The leg 313 of the air cutoff plate 310 which extends outside of the nozzle acts as a counterbalance to render the valve quicker acting. The counterbalance section of the air cutoff plate indirectly makes the valve quicker acting. When the valve is closed and air is on, a counterbalance section makes it possible to use a smaller coil to force the valve open. The use of a small coil means less magnetic decay time when the coil is de-energized. Thus, when a card is found and the coil de-energized, the air force can close the valve faster, since the coil releases faster. To this end the leg 313 abuts against an outwardly and upwardly extending plate 314 mounted on the nozzle adjacent the slot 312. Thus when the valve is closed or in the position shown in FIGURE 31, the valve operates to completely obstruct the flow of air from the nozzle 15. However, when the valve is pushed to the open position by an actuator pin 315 the air pressure acting against the leg of the cutoff plate outside the nozzle counteracts the air pressure against the bottom of the leg of the air cutoff plate 310 within the nozzle so that these two forces counteract each other and thus enable the valve to be moved from the closed to the open position by means of a much smaller coil or solenoid. When the valve is in the open position, the leg of the cutoff plate within the nozzle covers the slot 312 and prevents air from escaping at that point.

The valve actuator pin 315 is movable through an aperture 316 in the side of the nozzle and abuts against one side of the air cutoff plate 310. The pin 315 is attached to an oscillable arm 317 pivotally mounted upon a hinge pin 318 so that the arm is free to oscillate or rock about the hinge pin 318. At a point below the connection to the hinge pin 318, the arm 317 is connected to the armature 319 of a solenoid 320 operable when energized to pull the lower end of the arm 317 in the counterclockwise direction and thus move the actuator pin 315 into the nozzle to open the valve 309. When solenoid 320 is de-energized, a spring in the solenoid 320 causes the armature 319 to move to the left and withdraw the pin 315 from the nozzle. As the pin is withdrawn, air pressure within the nozzle causes the air cutoff plate 310 to rotate in the counterclockwise direction and quickly close the valve.

As shown in FIGURE 30, the rectangular orifice 321 of the nozzle 15 is bridged by a plurality of flat obstruction plates 322 which extend across the orifice so as to create turbulence of the air issuing from the nozzle 15. This turbulence functions to decrease the flutter of cards while they are suspended within the air stream issuing from the nozzle. This phenomenon is more fully described in the application of James Paulus, Serial No. 221,844, assigned to the assignee of this invention.

Referring to FIGURES 3, 4, 5 and 29, it will be seen that the nozzle supporting shaft 41 is connected by a linkage system 330 to the rocker arm assembly 104. As the drum is rotated during the scanning cycle the air nozzle is rotated in an opposite direction by the linkage 330. The purpose of this movement of the nozzle 15 counter to the direction of rotation of the drum is to maintain the nozzle and air stream beneath that card the top edge of which is aligned with the rollers 276, 277, 375 and 389. Because the pocket walls of each pocket are parallel rather than located in radial planes of the drum, the air stream would not always be directed against the bottom of the card the top edge of which was aligned with the rollers absent this compensation. As shown in FIGURE 4 where the misalignment compensation is illustrated, the nozzle must be rotated in the clockwise direction as the drum is rotated in the counterclockwise direction in order to place the center line of the nozzle beneath that card having a top edge aligned with the point of contact between the rollers 276, 277, 375 and 389. FIGURE 5 shows diagramamtically that if the drum is rotated without compensating movement of the nozzle, when the cards adjacent the partition walls are aligned with the rollers, the lower edge is out of alignment with the center line of the nozzle. For this reason the machine of this invention incorporates the linkage system 330 operable to move the nozzle in the clockwise direction as the drum rotates in the counterclockwise direction and vice versa during the scanning cycle.

As shown in FIGURES 3 and 29, shaft 41 (upon which the nozzle 15 is nonrotatably mounted) is connected at one end to a linkage member 331 so that the link 331 oscillates through an arc the shaft 41 rotates through a similar arc. Link 331 is connected at its lower end to a linkage member 332 connected by a pin 333 to the rocker plate 130. As shown in FIGURES 10 and 11, pin 333 is mounted eccentrically relative to the axis of the shafts 105, 106 so that as the rocker assembly 104 is oscillated, the pin 333 is caused to oscillate through an equal arc.

Card transport mechanism and selectors

A card transport mechanism 17 is mounted on the machine adjacent the selector mechanism 14 to convey a preselected card from a partially raised position to a viewing position in which the card is completely removed from the storage drum 13. It includes a plate 350 mounted in a vertical plane. This plate serves as a platen or guide to hold a card in viewing position. A wide strap 351 is mounted parallel to and spaced in front of the plate 350 by two small spacers or shifs 352. A glass plate or transparent plate 353 is mounted on top of and in the plane of the strap 351 so as to form a continuous flat surface therewith. The plate 350 and the strap 351 are positioned relative to the nozzle assembly 15 so that the air stream from the nozzle directs the selected card into the space between the plate 350 and the strap 351. Thus, when a preselected card is raised to a physically discrete position, it passes between the plate 350 and the strap 351.

Just above the cards 356 of the selected pocket are located the ends of twenty selector fingers 280, each positioned above one of the spaces in the cards which have been reserved for notches. These bars are each movable in a direction generally perpendicular to the plane of the cards as viwed in FIGURES 19 and 20, to either a retracted position or to an active or extended position overlying the cards suspended in the air stream. The selector fingers moving apparatus is not a part of this invention and is described in detail in Novak application Serial No. 158,811, assigned to the assignee of this invention. Each extended bar prevents upward movement of all cards directly beneath except those having notches in registry with the extended fingers.

Two small rollers 361 and 362 are fastened to a shaft 363 which in turn is mounted on the rearward side of the plate 350. Two small apertures in the plate 350 permit a portion of each roller to extend beyond the front surface of the plate 350. An electric motor 365 (FIGURES 13, 15, 16 and 17) drives a gear 366 fastened to the shaft 363 so as to rotate the rollers 361 and 362. Two pulleys, 367 and 368, fastened to opposite ends of the shaft 363, drive toothed timing belts 369 and 370 respectively, the former driving a pulley 371 on a shaft 372 beneath the plate 350 and the latter driving a pulley 373 on a shaft 374 also beneath the plate 350. Rollers 375 and 277 are mounted on the shafts 372 and 374 respectively and are vertically aligned with the rollers 361 and 362.

The plate 350 is formed with an aperture 378, which is aligned with a strip of transparent film mounted on the cards when the cards are in the viewing position on the transport mechanism 17. Near the top of the plate 350 is a bar 380, pivotally mounted, as will be more fully explained, which serves to position a card as it is raised by the rollers so that the film mounted on the card and the aperture 378 are in registry.

Referring to FIGURES 13 and 14 there can be seen the above mentioned aperture 378 and bar 380 and also two generally U-shaped brackets 381 and 832 fastened to the strip 351. Two rollers 383 and 384 are mounted on the top of brackets 381 and 382 respectively and are spring biased toward and rotated by the rollers 361 and 362 respectively. Two additional rollers 389, 276 are similarly mounted on the bottom of the brackets 381 and 382 respectively. The details of the mounting of these rollers will be described subsequently.

Referring now to FIGURE 13, there is shown the roller 361 mounted on the shaft 363 which in turn is carried by a bracket 387 fastened to the plate 350. The shaft 372, carrying the roller 375, is mounted on a bracket 388 fastened to the bottom of the plate 350. The roller 375 engages a roller 389 fastened to a shaft 390 which in turn is fastened to the lower end of a depending bracket 391. The bracket 391 is pivoted about a shaft 392, opposite ends of which are fastened to the U-shaped bracket 381. One end of a compression spring 393 bears against the bracket 391 while the other end bears against a screw 394 in the bracket 381 thereby urging the roller 389 against the roller 375. Short throw microswitches S1 and S2 are mounted in a recess in the bracket 381 with their actuators engaging a portion 395 of the bracket 391. When a card is drawn between the rollers 375 and 389, the bracket 391 swings counterclockwise as viewed in FIGURE 13 about the shaft 392 thereby actuating the switches.

The roller 383 is similarly mounted at the top of the bracket 381 and when a card is drawn between the rollers 361 and 383, the micro switches S10 and S11 are actuated.

The bracket 382 is identical to the bracket 381 but carries only one switch S12, at the top, actuated by the presence of a card between the rollers 362 and 384. Similarly, the bracket 382 carries a roller 276 and two switches, S3 and S4 (FIGURE 18), at the bottom. Thus, when a card enters the lower drive rollers four switches S1, S2, S3 and S4 are actuated and when a card enters the upper drive rollers three more switches S10, S11 and S12 are actuated. The switches are used for control purposes, as will be more fully explained hereinafter.

The distance between the two pair of lower rollers (one pair 375 and 389, being visible in FIGURE 21) and the two pair of upper rollers (361 and 383, FIGURE 21) is less than the width of the card so that as a card is drawn upward it is engaged by the rollers 361 and 383 before being disengaged from the rollers 375 and 389 as illustrated in FIGURE 21. The specific embodiment being described is designed for use with cards 3¼" wide and a distance between rollers of about 2¾" has been found satisfactory.

As shown in FIGURES 13 and 15, an elongated shelf 398 having a horizontal surface is pivotally fastened to the back side of the plate 350 near the top thereof. Shelf 398 is journalled upon a pin 396 supported by a pair of spaced brackets 397 rigidly attached to the vertical plate 350. Three small fixed blocks, of which block 399 is typical, are mounted on the top surface of the shelf 398. A shaft extending substantially the entire length of the shelf 398 is mounted in apertures in each of these fixed blocks. Three small rotatable blocks, of which block 401 is typical, are mounted to be rotatable about the shaft 400, one adjacent to each of the fixed blocks.

As best shown in FIGURE 13, the previously mentioned bar 380 has an L-shaped cross section. One arm extends across a cut out 402 in the plate 350 while the other arm is fastened to the rotatable block 401 and also to each of the rotatable blocks. Three micro switches S20, S21 and S22 are mounted on the shelf 398 with their actuators touching the block 401. The shaft 400 passes through the rotatable block 401 to one side, that is, to the left as viewed in FIGURE 13, so that the force of gravity urges the block 401 and the bar 380 clockwise to the position shown. The micro switch actuators touch their respective blocks 401 below the pivot point and when the parts are in the position shown in FIGURE 13, the actuators are depressed into their switches. It is apparent, that, when the bar 380 is raised, as by a card, the blocks 401 will pivot (FIGURE 22) depressing the actuators and thereby operating the switches.

Referring to FIGURE 13, it will be seen that a switch supporting bracket 403 is attached to the vertical plate 350. The bracket has an inclined wall 404 which supports the shelf 398 when it is pivoted away from the plate 350 as shown in FIGURE 23. Four switches S25, S26, S27 and S28 are mounted upon the bracket 403 in such a manner that their actuators 405 extend outwardly beyond the plane of the wall 404 so that when the shelf 398 is pivoted into engagement with the wall the actuators of all of these switches will be engaged and operated by the shelf. The function of these switches will be explained hereinafter in connection with the operation of the complete system.

As shown diagrammatically in FIGURE 4, the card transport rollers are stationary during a machine cycle while the cards are rotated to a position beneath the rollers. Since, as shown, the engaging surfaces of the rollers are directly above any card suspended in the air stream issuing from the air nozzle 15, any card raised by the flow of air will be engaged by the rollers.

Shown in FIGURE 19 is one of the selector bars 280 in its active or extended position. In this position the end of the bar 280 extends beyond the plane of action, that is, the plane which intersects the engaging surfaces of all of the rollers and the center line of the nozzle 15.

Referring now to FIGURE 28, there is shown the card file or drum 13 in its zero position. This is the position occupied by the file 13 when a previously withdrawal card is to be reinserted into the file or pack. A card is reinserted by reversing the direction of rotation of all of the rollers whereupon the lower edge of the card enters the gaps provided between the first card in the deck and the drum partition wall.

It is to be noted that the process of reinserting a card which has been completely withdrawn from the pack is facilitated by providing a reference position for the file so that each such card is returned to the same position in the file, that is, to the front of the pack. The fact that this process may change the relative positions of the cards within the file is immaterial because each card is coded and may be found and removed regardless of its location in the file.

It is often desirable to bulk-in-file, i.e. to file all of the cards in a selected pocket simultaneously. For instance when the drum is initially filled with the cards or when the cards in the drum are replaced with a complete set of new cards it is preferable that all of the cards within a pocket be filed simultaneously. For this reason the card transport mechanism is slidable from its normal operating position in a forward direction to a position as shown in FIGURE 17 in which a complete pocket is exposed.

When the card transport mechanism 17 is moved forwardly together with the selector finger mechanism 14, the selector finger mechanism engages normally closed safety switches S61 and S62 and normally open safety switch S63. As is more fully explained hereinafter, the opening of safety switch S61 prevents pocket scanning when the selector head is moved forwardly. Safety switch S62 opens a circuit to prevent drum rotation until a safety door 406 (FIGURE 3) is closed or moved forwardly to a position covering the opening 407 in the housing. The safety door 406 prevents the machine operator from inserting his hand into the drum through the opening 407 during drum rotation.

Closing of the opening 407 by means of safety door 406 closes the normally open safety switch S60 completing a circuit to the drum drive motor 103. Thus the drum may be rotated from one pocket to another while the card transport mechanism 17 is in its forward position only if the manually operated safety door 406 is closed. Safety switch S63 is included in a light circuit to lamp 1030 on the file cabinet. The lamp 1030 will light up when the card transport mechanism is in its forward position and the drum is not rotating. Thus it gives an indication to the machine operator that it is safe to open the safety door 406.

Digital selector switch

For purposes of controlling drum rotation from any pocket to any preselected pocket a digital selector switch 410 cooperates with the reversible driving motor 103 to control drum rotation via the shortest route to the preselected pocket. As shown in FIGURES 2, 29 and 36, selector switch 410 is driven by an endless chain 411 which is in turn driven by a sprocket 412 attached to the side wall plate 26 of drum 13. Sprocket 412 is mounted over a flange portion 413 of annular ring 57 and is spaced from the side wall plate 26 by a spacer ring 414 in such a manner that the sprocket 412 is driven by the drum 13.

Referring to FIGURES 36, 37, 38, 39 and 40, selector switch 410 includes a pair of L-shaped end brackets 415, 416, the horizontal legs 417, 418 respectively of which are bolted to the base of the frame 42 by bolts 419. Four mounting rods 420 extend between the vertical sections of the brackets 415, 416 and are secured thereto by bolts 421. Spacer sleeves 422 are secured over each of the rods between the brackets 415, 416 to prevent their inward collapse.

Three plates 425, 426 and 427 of insulated material are mounted upon the rods 420 in spaced relation. Two of these plates, 425 and 427, serve as stator plates upon which are mounted a plurality of electrical contacts or brushes. The other insulated plate 426 serves as a journal plate within which two bearings 430 and 431 rotate. A pinion shaft 432 extends through the bearings 430 and has one end journalled within a bearing 433 mounted within stator plate 425. The opposite end of the pinion shaft 432 has a pinion gear 434 mounted thereon which is driven in rotation by a larger gear 435 mounted upon the bearing 431. The shaft 436 of gear 435 extends through the bearing 431, through an aperture 437 in stator plate 427, and through a ball bearing 438 mounted within the end bracket 416. The free end of shaft 436 is nonrotatably attached to a sprocket 440 which is driven in rotation by chain 411.

A segment or tens commutator 441 is nonrotatably mounted upon shaft 436 and a pocket commutator 442 is similarly nonrotatably mounted upon pinion shaft 432. The pocket commutator 442 is secured to a flange 443 of bearing 430 by a plurality of screws 444 and a locating ring 445. The bearing 430 is nonrotatably keyed or pinned to the pinion shaft 432 by a tapered locking pin 446 so that the pinion and pocket commutator 442 rotate together. In a similar manner the segments commutator 441 is attached to an annular flange 450 of gear 435 by a plurality of screws 451. The flange 450 of gear 435 is nonrotatably keyed to the shaft 436 by a tapered pin 452 so that as the chain 411 drives the sprocket 440 it causes the shaft 436 and attached gear 435 to rotate. Rotation of gear 435 causes rotation of pinion shaft 432 and the pocket commutator 442. The ratio between the small pinion gear 434 and gear 435 is 2½:1 so that for every one rotation of gear 435, gear 434 and attached pocket commutator 442 rotates through 2½ revolutions.

Referring to FIGURES 36 and 37, it will be seen that the segments stator 427 has seven contacts or brushes mounted thereon. Each is spring biased into engagement with the segments commutator 441. The segments commutator controls rotation of the drum via the shortest path at a high speed to the preselected segment or ten pockets. Since in the preferred embodiment there are fifty pockets in the drum the segments stator has five equally spaced brushes 460, 461, 462, 463 and 464 located thereon representing or controlling rotation of the drum to the zero to 9th pocket, 10th to 19th pocket, 20th through 29th pocket, the 30th to 39th pocket and the 40th to 49th pocket respectively. Additionally, there are two common brushes 465 and 466 mounted upon the segments stator 427 and engageable with the segments commutator 441. One of the common brushes 465 is located closer to the axis 436 of the commutator 441 than the five segments brushes 460, 461, 462, 463 and 464 while the other common brush 466 is located at a greater distance from the axis than the five segments brushes.

The segments commutator 441 has two electrically conductive foil sections mounted thereon in a generally concentric manner. The outer section of foil 470 is generally circular and has an arcuate section 471 of increased thickness which extends through approximately 144°. The inner section 472 is mounted concentric with the outer section and has an arcuate portion 473 of greater thickness than the remaining portion. The thickened section 473 also extends through an arc of approximately 144°. The thickened sections 473 of foils 471 and 473 are located in closely adjacent but nonabutting relation so that an insulated area 474 separates all portions of foil 470 from foil 472. Through approximately 288° the foils are separated by a relatively narrow band of insulative material while in a 72° arcuate section they are separated by a wide insulative area. The inner common brush 465 always engages the inner foil 472 while the outer brush 466 always engages the outer foil 470. The five segments or tens brushes 460, 461, 462, 463 and 464 are engageable with either the inner or outer foil depending upon the location of the segments commutator 441 relative to the segments stator 427. In all locations of the segments commutator 441, two of the segments brushes will be in engagement with the inner foil 472 and two of the segments brushes will be in engagement with the outer foil 470 while one of the segments brushes will be engaged with the wide insulative area 475.

Referring to FIGURES 36 and 38, it will be seen that the units brushes, 0–9, are spaced approximately 17° apart on the arc of a semi-circle so that the units 0 brush is located approximately 170° from the units 9 brush. All of the units brushes, 0–9, are mounted upon the stator plate 425 and are spring biased into engagement with the units commutator 442. Two other common brushes, 480, 481, are also mounted upon the units stator plate 425. The common brushes 480, 481 are mounted approximately 180° apart relative to the axis of the units commutator 442. One of these commons 480 is mounted closely adjacent the 9 unit brush on a radius slightly greater than the radius of the arc upon which the 0–9 units brushes are mounted. The other common brush 481 which is mounted 180° away relative to the common brush 480, is located upon a radius slightly less than the radius of the units brushes. The units commutator 442 also has two generally annular concentric foil sections 485, 486 mounted thereon and engageable with selected brushes on the units stator plate. The outer foil section 485 is relatively thin through an arc of slightly more than 180° and thick through an arc of slightly less than 180°. The inner foil section 486 is relatively thin through slightly more than 180° and thick through an arc of slightly less than 180°. The two sections are concentrically mounted upon the commutator plate with the thick portion of the inner foil section adjacent the thin portion of the outer foil section. Thus the two define therebetween two insulative arcuate sections of varying radius interconnected by two insulative radial sections.

The units commutator also has an electrically conductive section of foil 490 mounted adjacent its periphery. This section 490 is effective to close an electrical circuit through either of two pair of brushes mounted approximately 180° apart on the units stator 425. Referring to FIGURE 38, one pair of these brushes is designated as 491, 492 and the other pair is designated as 493, 494. Each pair of brushes, when electrically connected by the section of foil 490, are operative to energize a flip-flop circuit. This flip-flop circuit cooperates with the foil sections to maintain a fixed direction of motor rotation as it moves the drum from one pocket to the next preselected pocket. Without the flip-flop circuit, the motor would often reverse the direction of rotation when control was switched from the segments commutator to the units commutator.

In this particular application, to control a drum with 50 pockets, the low speed or segments commutator has five contacts, equally spaced on a circle; whereas the high speed plate or units commutator has ten contacts, equally spaced on half a circle. As explained above, the two control discs are mechanically connected by means of a gear having a ratio of 2.5:1. Therefore, the "high speed" discs or units commutator turns half a revolution, scanning ten contacts or "pockets," during the time the "low speed" disc or segments commutator rotates ⅕ of a revolution, scanning one contact or one segment. A typical selection of a "pocket" always occurs in the following way. First, the selector switch will find the segment, which the selected pocket is part of, on the shortest path. Upon entering the segment, the same direction of rotation will be maintained until the selected pocket is found; i.e., the energized contact is opened at the non-conductive stopping gap of the high speed disc. This is accomplished by associated control circuitry which will be described hereinafter in connection with the machine operation. When a pocket is selected in the same segment, the selected pocket is controlled by the high speed disc only. Therefore, it will find immediately the selected pocket on the shortest path.

Since the high speed disc is a commutator with two "halves" or split phases to obtain the "shortest path" rotation of the drum, a "flip-flop" circuit is required to maintain predetermined direction of rotation when entering or crossing segments. This occurs at every half a revolution of the high speed disc. The four outer contact rivets—two on either side—are used to control a latch relay which, in turn, reverses the direction of rotation which each half of the units commutator controls at every half a revolution of the units commutator. This is required only when pockets in different segments are selected.

In this particular application, to control a drum with 50 pockets or five segments, another latch relay is required to correct the flip-flop for different directions of rotation. This latch relay is controlled by the low speed disc or segment control and is required whenever there is an odd number of segments. This latch relay actually reverses the flip-flop for the two directions of rotation. The operation of these latch relays and associated flip-flop circuits will be more fully appreciated in connection with a reading of the operation of the machine and associated circuitry which follows.

*System operation*

Power is supplied to the control circuit of this invention from a 115 volt A.C. source to the leads 500, 501 (FIGURE 43). The leads 500, 501 are connected by leads 502, 503, 504, 505 and 506 to a projection lamp 507 upon the closing of a three position switch 508. The center position of switch 508 is labeled off and one contact 509 of the switch is labeled TV while the other contact 510 is labeled projector. When the switch is placed in the projector position, the projection lamp 507 receives full line voltage via a circuit through contact 510 of switch 508. When placed in the TV position, the switch is connected through a contact 509 and brush 511, through a variable transformer 512 to the line 504. Thus when the switch 508 is in the TV position, the projection lamp receives less than full line voltage. The lamp cooling blower 514 is connected across the lines 502 and 505 so that it is always on whenever the machine is plugged into a 115 volt A.C. source.

The line 501 is also connected via lead 515 to the primary winding 516 of a transformer 519 through the normally open master switch 517, a circuit breaker 518 and lead 502 to line 500. Power is supplied to the primary winding of the transformer whenever the master switch 517 is closed. Additionally, closing of the master switch 517 supplies A.C. power to the motors of the machine via leads 515, 520 and main lead 521 and from line 500 via leads 502, 503, 504 and 505, through normally closed contact K16–3 to the main lead 522. The leads 521 and 522 are the main leads to the A.C. machinery of the system.

Power from the secondary winding 525 of the transformer 519 is supplied via lead 526 through a fuse 527, lead 528, through normally closed contact K16–2 and lead 529 to one leg of a rectifier bridge 530. The opposite leg of the rectifier bridge 530 receives low voltage A.C. current from the secondary winding 525 of the transformer 519 via lead 531. The two output contacts of the rectifier bridge supply D.C. power to the main control circuit via leads 532 and 533. The leads 532 and 533 are the main control circuit leads.

Connected between the lines 526 and 531 is the "power on" indicator lamp 535 mounted upon the file cabinet. The lamp 535 is connected to the lead 526 by lead 537 and to the lead 531 by the lead 538.

Connected between the lead 528 and 531 are rectifier bridge 541, input leads 539 and 540 by means of which D.C. power is supplied to an emergency stop circuit. One output lead 543 from the rectifier bridge 541 is connected to one contact 544 of a normally closed "reset" switch 545. The other output lead 546 from the rectifier bridge is connected to one side of an emergency indicator lamp, the opposite side of which is connected via a lead 547 to a normally open emergency stop switch 548. An emergency stop lockout relay K16 is connected in parallel with the emergency stop lamp 549. In the event of an emergency such as a jammed card in the drum or a defective relay in the control circuit, etc. closing of the emergency stop switch 548 completes a D.C. circuit from the rectifier bridge via lead 543, normally closed reset switch 545, lead 550, closed emergency stop switch 548 and leads 547 and 546 to the emergency lamp 549 and the emergency stop lockout relay K16. Energization of relay K16 closes the normally open contact K16–1 to maintain the circuit to relay K16 after the emergency stop button is released. The contact K16–2 also opens to open the power supply circuit to the rectifier bridge 530 and thus turn off the power to the main lines 532, 533 of the control circuit. Additionally, energization of relay K16 causes the contact K16–3 to open and turn off all A.C. power to the main lines 521, 522 and thus to all of the A.C. machinery in the system. To release the emergency stop lockout relay K16 opening contact K16–1 and closing normally closed contacts K16–2 and K16–3, the reset switch 545 is manually opened which de-energizes the relay K16.

Also connected across the leads 529 and 531 are the keyboard button indicator lamps 555 which are connected to these leads by leads 556 and 557. While only one lamp is illustrated in the circuit diagram, in actuality there are 35 such indicator button lamps connected in parallel and associated with the units, tens, hundreds and thousands buttons, each lamp of which goes on beneath the button to indicate that a selected button has been closed or selected when the keyboard button is pushed downwardly. A switch 558 is connected in series with each lamp, each switch of which is closed upon the pushing downwardly of each keyboard button.

To select a pocket and to cause a drum to move to the preselected pocket, one of the thousands push buttons 551 (see FIGURE 1) and one of the hundreds push buttons 552 must be selected and pushed manually by the system's operator. Additionally, the search button 560 at the keyboard must be actuated by the system's operator. By way of example assume that the drum is at the 23rd pocket initially and the No. 36 pocket is selected by the system's operator. The operator therefore pushes the fourth push button in the thousands push button row 551 and the seventh push button in the hundreds push button row 552. When these push buttons are actuated they cause the switch 558 associated with each to close and light the lamps 555. Each of the thousands and hundreds push buttons are double pole switches. The A contacts of the thousands push buttons are connected in series in a thousands push button bank 561 and the B contacts are similarly connected in series (only one of the thousands B contacts being illustrated at 562). The hundreds push button A contacts are similarly connected in series in a bank 563 and the B contacts are similarly connected in series in a bank 564 (only one of the B contacts in the hundreds row being shown). The thousands B contacts 562 and the hundreds row B contacts 564 are series connected so that one of the thousands push buttons and one of the hundreds push buttons must be energized before a search is initiated.

When the search button is actuated at the keyboard, it causes the contact SB1 (FIGURE 42) to momentarily close and energize the relay K15 via leads 566, 567, 568, contact SB1, lead 569, the closed B contact in the thousands bank 562, the closed B contact in the hundreds bank 564, and lead 570. Energization of relay K15 closes the holding contact K15–1 and maintains the relay K15 energized. The energization of the relay K15 also closes the contact K15–2 (FIGURE 43) so that power may be supplied to the pocket selection control circuit.

Assuming that the No. 36 pocket is selected by the system operator, the fourth push button in the thousands contact row is pushed and the A contact completes a circuit to the relays K4 and K5 via lead 575, the brush 463, the outer foil section 470 on the thousands commutator 441, the brush 466, leads 576 and 577, lead 578, normally closed contact K11–3, and leads 579, 580 and 581. Energization of relay K4 closes the holding contact K4–1 to maintain power to the relays K4a and K5a even though the relay K11 subsequently causes the contact K11–3 to open.

When the 36th pocket is selected by the system operator, the 7th contact in the hundreds A bank is closed and the relay K35 thus energized through a circuit via lead 584, the closed contact 585 of the bank of contacts 563, the seventh brush on the hundreds stator 425, the foil 485 on the hundreds commutator, the brush 480, leads 586, 587, through rheostat R4 and lead 588.

Energization of the relay K35 closes the contact K35–1 to complete a circuit to the relays K10 and K11 via lead 566, lead 589, closed contact K35–1 and closed contact K6–2A, lead 590 and lead 591, lead 592, through diode 593, through relays K10 and K11, leads 594, 595, the closed contact K15–2, closed switches S71 and S70 which remain closed so long as the card compressor fingers are out of the drum, closed card transport safety switch S62, lead 596, the closed contact K30–2A, and lead 597. A capacitor C6 is connected in parallel with the relays K10 and K11 and acts as a delay circuit to delay de-energization of these relays for the period of time constant of the capacitor C6.

Two relays K8 and K9 connected to leads 592 and 594 in parallel with relays K10 and K11 are energized simultaneously with relays K10 and K11 via a circuit through leads 600, 601, normally closed contact K13–1, and lead 602. Energization of relay K8 causes the drum rotating motor 103 to start to rotate, in this case in the clockwise direction as viewed in FIGURE 3. Referring now to FIGURE 44, it will be seen that A.C. power is supplied to the motor field and armature windings of motor 103 via closed contact K1–1, through the two resistors, R2 and R3, via lead 605, lead 606, through the closed contact K8–1B, lead 607, through contact K7–1A, via lead 608, through motor field winding 609, via lead 610, through contacts K7–2A and K8–2B and via lead 611. At this time the motor 103 starts to rotate. The relay K9 which is energized simultaneously with the relay K8, is a motor controlled dynamic braking relay which causes the contact K9–1 to move to the open position and thus this relay prevents D.C. braking current from being supplied to the motor field winding 609 at this time.

Energization of relay K10 causes the contact K10–1 (FIGURE 44) to close so that A.C. current is supplied to the primary winding 615 of transformer 616 via leads 617, closed contact K10–1, and lead 618. The secondary winding 619 of transformer 616 supplies low voltage A.C. current to a rectifier bridge 620. There is no flow of current from the rectifier bridge at this time because the contact K9–1 is open.

Energization of the relay K11 closes the contact K11–1b (FIGURE 41) to charge capacitor C8 via leads 625, through diode 626, leads 627 and 628, through contacts K11–1 and K14–1 and via lead 629. When the capacitor C8 is discharged, it energizes the keyboard release solenoids 711 and 712 as is explained more fully hereinafter.

The energization of relay K11 also closes the contact K11–2B (FIGURE 43) to pulse the relay K12, the current being supplied via lead 566, 630, 631, through capacitor C4 and relay K12, and via lead 632. Energization of relay K11 also opens the contact K11–3 (FIGURE 43) but this has no effect upon the relays K4 and K5A since the holding contact K4–1 is at this time closed. The contact K11–4 also opens upon energization of relay K11 so that the capacitor C11 is not charged at this time.

When the relay K12 is pulsed the contact K12–1 momentarily closes to energize the speed control relay K1 and the speed control lock in relay K2 via leads 566, 589, contacts K35–1, K6–2, leads 591, 592, 635, 636, through contact K12–1 and via leads 637, 595, 596 and 597. The closing of relay K2 causes the holding contact K2–1 to close and maintain the relays K1 and K2 energized.

When the machine was turned on, the relay K13 (FIGURE 43) was pulsed through the normally closed contact K2–2A by completion of a circuit via leads 566, 567, 630, 631, 633, contact K2–2A, capacitor C3, and lead 581. Upon energization of the relay K2, the contact K2–2 opens or engages the B contact to form a closed loop around the capacitor C3 and thus discharge the capacitor C3. In this condition, the motor control brake relay K13 is in condition to be pulsed upon de-energization of the relay K2 and consequent closing of the contact K2–2.

Energization of the speed control relay K1 closes the contact K1–1B so that a greater voltage is supplied to the motor 103 and its speed is increased. In this position of the contact K1–1 the circuit to the motor is completed via leads 650, through the contact K1–1B, through a high speed centrifugally operated governor switch 651, through lead 652 and resistor R3, via leads 605 and 606, through the contact K8–1 to the motor 103. In the event that the motor rotates at a greater speed than that for which it is set the high speed governor 651 opens and the circuit to the motor is completed via lead 653, through resistor R1 and leads 655 and 606 to the motor. The resistor R1 is of greater resistance than either of the resistors R2 and R3 which combined have a greater resistance than the resistor R1, so that less voltage is supplied to the motor and its speed is reduced. An arc supression capacitor C2 is connected in parallel with the resistor R1 to minimize arcing in the speed control governor switch during changes in speed of the motor 103. Similarly, a capacitor C1 is connected in parallel with the resistor R3 across the leads 652 and 605 so as to minimize arcing.

When the drum is rotated from the 23rd pocket to the 36th, as viewed in FIGURE 2, the drum rotates in the counterclockwise direction causing the sprocket 440 to rotate in the same direction carrying with it the thousands or segments commutator 441. The hundreds commutator 442, however, rotates in the opposite direction. Thus as viewed in FIGURES 37, 38, 39 and 40, both commutators are rotating in the counterclockwise direction with the hundreds commutator rotating 2½ times as fast as the thousands or segments commutator. As the drum rotates from the 23rd pocket to the 36th pocket, the gap in the foil on the thousands commutator or insulated portion of the commutator moves to a position at the 26th pocket where the insulated portion of the commutator interrupts the circuit to the relay K35. However, the brush 463 on the thousands or segments commutator remains engaged with the foil 470 until the 30th pocket is reached so that the circuit to the relay K4 is maintained. Thus the contacts K4–2 remains closed and the circuit to the relays K1 and K2, K10 and K11, and K8 and K9 is maintained as the drum passes the 26th pocket via a circuit through lead 566, leads 640 and 641 and contact K4–2. Thus the contacts K35–1 and K36–1 are by-passed at this time so that the segments or thousands commutator over-rules the hundreds commutator and the drum continues to rotate and the relays K1 and K2, K10 and K11 and K8 and K9 remain energized via this by-pass circuit through the contact K4–2 until the proper segment of the commutator is entered.

As shown in FIGURE 39, when the drum rotates to a position in which the 27th pocket is in the 12:00 position and the insulated section of the hundreds commutator covers the number seven brush of the hundreds commutator, the inner foil ring 486 establishes electrical contact between the number six brush of this commutator and the brush 480 to energize the relay K36 via a circuit through the closed A contacts of the bank of switches 563, through the number six brush of the hundreds commutator, via the foil 486 and through the leads 660, 587 and 588. At this time the relay K35 is de-energized since none of the A bank switches in contact with the outer ring of foil 485 is closed. Thus the contact K35–1 opens and the contact K36–1 closes. Closing of the contact K36–1 closes a secondary circuit to the coils K1 and K2, K8 and K9, K10 and K11 via a circuit through leads 566, 589, contact K36–1, contact K6–1, lead 661, lead 662, lead 592 and leads 635, 594 and 600. The directional relay K7 remains de-energized at this time since the contact K4–3 of relay K4 is in series with the relay K7 and is open at this time.

When the commutator moves to the position illustrated in FIGURE 40 and the drum is in a position intermediate the 29th and 30th pockets, the foil section 490 on the hundreds commutator covers both of the brushes 491 and 492 and completes a circuit between these brushes to energize the relay K6A via a circuit through lead 665, brush 492, foil section 490, brush 491, contact K5–1 which is engaged with its B contact as a result of the relay K5A having been energized simultaneously with the relay K4, lead 666, and leads 667, 668, 578, closed contact K4–1 and leads 579, 580 and 581. The contacts K5–1 and K5–2 are contacts of a flip-flop circuit both of which reverse their positions and reverse the polarity of the contacts with which they are engaged upon energization of either relay K5A or K5B. Energization of relay K6A reverses the positions of the flip-flop contacts K6–1 and K6–2 so as to reverse the polarity of the contact with which each of these is engaged. The varying of the positions of the contacts K6–1 and K6–2 completes a circuit to the relays K1 and K2, K10 and K11 and K8 and K9 via lead 566, contact K36–1, contact K6–1B, lead 670, and leads 591 and 592. Simultaneously the circuit to the relays K1 and K2, K8 and K9 and K10 and K11 which had been closed via contact K6–1A, leads 661 and 662 is open. Since the relay K35 is de-energized at this time, the contact K35–1 is open and there is thus no current flow in lead 690 at this time.

When the drum reaches the position in which the 30th pocket is in the 12:00 position, the thousands commutator 441 will be in a position in which the insulated portion 475 of the commutator 441 covers the brush 463 and thus opens the circuit to the relays K4 and K5A. De-energization of relays K4 and K5A opens the holding circuit through K4–1 to the relay K4 and opens the contact K4–2 (FIGURE 43) and closes the contact K4–3 to the directional relay K7 (FIGURE 43). Closing of the contact K4–3 at this time does not energize the relay K7 which when energized causes the drum to rotate in the counterclockwise direction because the circuit to the relays K1 and K2, K8 and K9 and K10 and K11 is completed at this time by a lead 566, contact K36-1, contact K6-1B, lead 670, lead 591, and lead 592. While the circuit to the directional relay K7 is closed upon the closing of the contact K4-3, the diode 693 effectively blocks the current flow through that relay at this time. Therefore the drum will continue to rotate in the clockwise direction after the 30th pocket is passed until the 36th pocket which is the selected pocket is reached.

When the drum reaches the 36th pocket the hundreds commutator 442 is located in a position in which the insulated section 700 is located over the No. 6 brush so that the relays K35 and K36 are both temporarily de-energized with the result that the contacts K35-1 and K36-1 are both simultaneously opened. Thus the circuits to the relays K1 and K2, K8 and K9, K10 and K11 are all opened.

However, the capacitor C6 in parallel with the relays K10 and K11 forms a delay circuit for these relays so that they remain temporarily energized for the length of time equal to the time constant of the capacitor. De-energization of relay K2 causes the contact K2-2 (FIGURE 43) to move into the A position in which a circuit is completed through the capacitor C3 so as to pulse the relay K13. Pulsing of relay K13 temporarily opens the contact K13-1 (FIGURE 42) and then allows the relay to again close. The reason for the pulsing of the relay K13 and temporary opening of the contact K13-1 is to insure that the direction relay K7 is not energized at this time since this would cause the main drive motor to immediately rotate in the counterclockwise direction. Additionally, opening of contact K13-1 maintains relays K8 and K9 deenergized to insure that the drum stops completely before reversing.

Deenergization of relay K8 causes the contacts K8-1 and K8-2 (FIGURE 44) to move to the A position so that the A.C. power supply circuit to the armature of motor 103 is opened. Deenergization of relay K9 causes the contact K9-1 to close so that D.C. power is supplied from the rectifier bridge 620 to the field winding 609 of motor 103 via lead 701, closed contact K9-1, contact K7-1A, lead 608, lead 702, lead 610, contact K7-2A and K8-2A and via lead 703. During this time interval when there is no current to the armature of motor 103 and D.C. current is supplied to the field winding 609 of motor 103, the motor is dynamically braked and brought to a halt.

The relays K10 and K11 are not deenergized at this time since the capacitor C6 connected in parallel with these two relays, discharges until the drum coasts past the gap or insulated portion of the hundreds commutator 442 at which time the opposite section of foil 485 engages the No. 6 brush on the commutator and again energizes the relay K35 to complete the circuit to these relays. At this point it should be noted that the drum does not stop immediately upon arriving at the selected pocket, the 36th pocket in this example, since it is rotating at high speed and coasts past the pocket for a slight distance. The amount of coasting, of course, depends upon numerous variables such as the inertia of the drum, the amount of D.C. power applied to the field winding of the motor, etc. By way of example assume that the drum continues to rotate or coasts to the 38th pocket before it finally stops.

As the drum rotates past the 36th pocket the No. 6 brush on the hundreds commutator engages the outer ring of foil 485 to again energize the relay K35 causing the contact K35-1 to close. Closing of the contact K35-1 completes a circuit to the relays K8, K9, K10 and K11 via lead 566, lead 589, contact K35-1, contact K6-2B, leads 690, 661, 662, through diode 693 and via lead 592. The closing of contact K35-1 also completes a circuit to the directional relay K7 at this time via leads 661 and 705 through the diode 706, via lead 707, through the closed contacts K4-3 and K13-1 via leads 602, 595, 596 and 597. A capacitor C5 is connected in parallel with the directional relay K7 between leads 705 and 707 so that the directional relay K7 is not energized until after the relays K1 and K2 and K8 and K9 are energized. When the relay K7 is energized it causes the contacts K7-1 and K7-2 to move into their B positions in which position the motor 103 is driven in the counterclockwise direction.

When the drum rotation starts in the opposite or counterclockwise direction toward the 36th pocket from the position in which it stopped, it rotates at a slow rate of rotation since the speed control relay and speed control lock in relay K1 and K2 respectively remain deenergized. These relays are deenergized since the contact K2-1 opens as the selected pocket is passed the first time at the high speed rate or rotation and the relay K12 is not again pulsed so that the contact K12-1 thus remains open. With the relay K1 de-energized low voltage current is supplied to the motor via a circuit through lead 650, contact K1-1A, resistor R2, lead 652, a low speed centrifugal governor switch 708, lead 606, contact K8-1B, through the armature of motor 103, lead 607, lead 709, contact K7-1B, lead 710, lead 610, through the field winding 609 of motor 103, lead 702, lead 608, contact K7-2B and contact K8-2B and lead 611.

The motor thus rotates at the slow rate of rotation in the counterclockwise direction until the drum arrives at the selected 36th pocket. At this time the gap 700 in the hundreds commutator again covers the No. 6 brush of the hundreds stator and opens the circuit to both the relays K35 and K36. Deenergization of relays K35 and K36 opens the contacts K35-1 and K36-1. Opening of these contacts results in the relays K8 and K9 being immediately de-energized so that A.C. current to the armature of motor 103 is discontinued upon the opening of the contact K8-1B. D.C. braking current from the rectifier 620 is then supplied to the field winding 609 of the motor via a circuit through lead 701, closed contact K9-1, contact K7-1B, lead 710, lead 610, through the winding 609, via lead 702, lead 608, contact K7-2B, contact K8-2A and lead 703. Thus the motor is immediately braked and since it is rotating at a slow rate of rotation, it does not coast past the selected pocket.

Upon discharge of the capacitors C5 and C6, the relays K7, K10, and K11 are de-energized to condition the motor control circuit for the next cycle of operation. De-energization of relay K10 opens the contact K10-1 (FIGURE 44) and thus the circuit to relay K11 closes the contact K11-1A (FIGURE 41) discharging the capacitor C8 through the hundreds and thousands keyboard button release solenoids 711 and 712 via a circuit through leads 629, contact K14-1B, contact K11-1A, and lead 713. The pulsing of the hundreds and thousands release solenoids 711 and 712 opens the circuit to all of the hundreds push button A contacts and the thousands push button A contacts as well as the B contacts of these same push buttons. Opening of the hundreds and thousands B contacts opens the circuit to the relay K15 (FIGURE 43) to de-energize this relay. De-energization of the relay K11 also closes the closed loop circuit around the capacitor C4 (FIGURE 43) to discharge this capacitor through the closed loop and thus condition it for pulsing the relay K12 during the next cycle of operation. De-energization of the relay K11 also closes the contact K11-3 to condition the relays K3, K4, K5A and K5B for the next cycle of operation. The opening of the circuit to the relay K11 also closes the contact K11-4 (FIGURE 43) to condition the speed control lockout relay K12 for the next cycle.

In the event that a pocket is selected on the hundreds and thousands keyboard push buttons which is in the 12:00 position or adjacent the selector fingers, a drum position sensing relay K14 (FIGURE 41) is provided which will immediately pop the keyboard buttons outwardly and allow the pocket scanning operation to proceed. When the hundreds and thousands push buttons are initially actuated and the search button pushed the relay K15 is energized as was explained heretofore. Energization of relay K15 closes the contact K15-3B causing the relay K14 to be pulsed via a circuit through lead 625, contact K15-3B, lead 715, capacitor C7, the relay K14, and the leads 716 and 717. The pulsing of relay K14 causes the contact K14-1A to momentarily close and charge the capacitor C8. The contact K14-1A then immediately opens and the contact K14-1B closes since the relay K14 was pulsed through the capacitor C7 and did not remain energized. Since the relay K11 will not be energized if the selected pocket is in the 12:00 position, the contact K11-1A is closed and the capacitor C8 is immediately discharged through the hundreds and thousands keyboard release solenoids 711 and 712 via a circuit through lead 629, contact K14-1B, contact K11-1A and lead 713. Thus the keyboard release solenoids are pulsed immediately upon actuation of the search button and the scanning cycle will immediately start if the selected pocket is in the 12:00 position at the time the search is initiated.

Assuming that a pocket was selected which as viewed in FIGURE 3 required counterclockwise movement of the drum in order for it to rotate via the shortest route to the selected pocket, the control circuit would operate in much the same manner as outlined above except that in this situation, the directional relay K7 would be energized simultaneously with the relays K1, K2, K8, K9, K10 and K11. By way of illustration assume that the pocket No. 23 was initially in the 12:00 position and the No. 10 pocket was selected. Under these circumstances relays K3 and K5-B would initially be energized rather than the relays K4 and K5-A. The circuit to the relays K3 and K5-B would then be completed via lead 575, brush 461, foil section 472, brush 465, through relays K3 and K5-B, via leads 468 and 578, through normally closed contact K11-3 and via leads 579, 580 and 581. Energization of relay K3 closes the holding contact K3-1 to maintain the relay K3 energized until the drum reaches the selected segment. Energization of the relay K3 also closes the normally open contact K3-2 to complete a circuit to the relays K1 and K2, K8 and K8, K10 and K11 and the directional relay K7 via leads 566, 640, contact K3-2, lead 661, leads 705 and 662. With the relay K7 energized the contacts K7-1B and K7-2B close to energize the drum rotation motor 103 in the counterclockwise direction as was explained earlier. Energization of the relay K5-B in this situation closes the contacts K5-1B and K5-2B to energize the relay K6-B. Energization of the relay K6-B closes the contacts K6-1B and K6-2B to maintain these flip-flop contacts in the correct position for maintaining counterclockwise rotation of the drum when the control is transferred from the thousands or segments commutator 441 to the hundred or pocket commutator 442. In all other respects the pocket selection cycle operates in the same manner when started in the counterclockwise direction as when started in the clockwise direction.

*Pocket scanning*

With the proper pocket or preselected pocket in the 12:00 position the machine is ready for scanning upon actuation of the tens and units buttons. The tens and units buttons on the keyboard control the selection of the preselected card within the pocket which is in the 12:00 position. Actuation of one of the units buttons 750 and one of the tens buttons 751 closes one of the units A contacts 800 and one of the tens A contacts 801. Only one of the units A contacts and one of the tens A contacts 801 is shown in the drawings although there are ten such A contacts in each of the banks 800, 801, all of which are connected in parallel. The units A contacts 800 are in series with the tens A contacts 801 so that one button in each bank must be actuated to energize the circuit. Similarly actuation of one of the tens units buttons closes one of the units B contacts 802 and in like manner selection and actuation of one of the tens buttons closes one of the tens B contacts in the bank 803. With one of the units buttons and one of the tens buttons closed actuation of the search button momentarily closes the contact SB2 (FIGURE 42) to complete a circuit to relay K21 via lead 804, normally closed contact K28-2, lead 805, the series connected units A switch 800 and the tens switch 801, relay K21, lead 806, contact SB-2B, lead 807, lead 808, contact S50B and lead 809. The switch S50 is the zero position switch which is actuated or caused to close its A contact only when the cards within a pocket are compressed and the drum is in the card in-filling or zero position.

Energization of relay K21 closes the normally open contact K21-1 to complete a holding circuit around the SB-2 switch which normally engages its B contact only momentarily when the switch button is pushed. Energization of relay K21 also closes the normally open contact K21-2 (FIGURE 42) to complete a circuit to the relays K22, K23 and K24. A capacitor C10 is connected in parallel with the relay K22 to delay de-energization of this relay until after relay K23 is de-energized. The relay K24 is pulsed since a capacitor C9 is connected in series with this relay. The circuit to the relays K22, K23 and K24 is completed via lead 584, the closed A contacts of the hundred push button switches 563 (which are all closed after the selected pocket is in the 12:00 position), lead 812, normally closed switch S-61, closed contact K21-2, lead 813 and lead 814 to the relay K22, lead 815 to the relay K23, and lead 816 to the relay K24.

Pulsing of the relay K24 causes the contact K24-2B to close, completing a circuit to the rectifier bridge 820 (FIGURE 44) via lead 821, closed contact K33-2A, lead 822, contact K24-2B, lead 823 and lead 824. D.C. power is supplied from the rectifier bridge 820 to the rotary solenoid 827 via leads 825, and 826 from the rectifier bridge. The rotary solenoid 827 causes all of the selector fingers 280 in the selector head assembly to move outwardly over all of the cards in the selected pocket. When the contact K24-2B closes, opening the circuit to the rotary solenoid, all of the fingers are spring biased rearwardly to a withdrawn position except the two preselected ones which are held in the extended position by drop pins (not shown) in the selector head 14. The preselected drop pins are energized by the closing of the pre-selected ones B contact 802 (FIGURE 42) and the tens B contact 803 which energize solenoids 845 and 846 respectively. The circuit to the solenoids 845 and 846 is completed via lead 584, through the hundreds push button A contact bank 563, through the lead 812, closed switch S-61, closed contact K21-2, lead 847, through the units and tens contacts 802 and 803, and via leads 848, 849 and 850 through the normally closed switch S-80. Thus the solenoids 845 and 846 hold the drop pins extended and prevent the selected fingers from being retracted so that these fingers extend out over the card and restrain all but the selected card against movement as the pocket is scanned. The operation of the selector assembly is completely described in Novak Application Serial No. 158,811 assigned to the assignee of this invention.

Energization of relay K23 closes the contact K23-1 (FIGURE 44) completing a circuit to the series wound blower motor 830 via lead 831, through contact K23-1, via lead 832, lead 833, through the autotransformer 834, via lead 835, through the contact K24-1A, through lead 836 and the field winding 837 of the blower motor, through the armature of the blower motor 830 and via lead 838. When the blower motor is started, the autotransformer 834 is by-passed so that full line voltage is applied to the blower motor 830. In this manner the blower motor starts up very fast. After it reaches operating speed and the proper air pressure is attained, the circuit is returned through the autotransformer 834 to hold the blower motor at the operating speed. To accomplish fast starting of the blower motor, the relay K24 is pulsed as was described earlier, causing the contact K24–1B to be momentarily closed so as to complete the circuit to the blower motor 830 via lead 332, lead 83°, contact K24–1B and lead 836. In this manner the full line voltage is applied to the blower motor so long as the relay K24 remains energized. Thereafter, the relay K24 drops out and the autotransformer is inserted into the circuit to reduce the voltage to the blower motor.

Closing of the contact K23–1 upon energization of relay K23 also completes a circuit to the scanning timer control T1 through a circuit completed by leads 831, 832, 839 and 840, through normally closed contact K40–2 and lead 841.

Simultaneous with the start of the scanning operation, the scanning drive unlock solenoid 143 (FIGURES 41 and 10) is energized causing the interlock bar 135 to disengage from the rocker arm assembly 104 so as to permit the scanning arm assembly to oscillate and thus oscillate the drum during scanning. The scanning drive unlock solenoid 143 is energized through a circuit via lead 584, via the hundreds push button A contacts 863, leads 812, 847, through diode 855, via lead 856, through the normally closed contact K32–3, via lead 857, through the scanning drive unlock solenoid 143 and via lead 858. Energization of the solenoid 143 disengages the arm 139 from the actuator of switch S75 and permits the switch S75 to close.

Simultaneous with the energization of the scanning drive unlock solenoid 143, relay K26 (FIGURE 41) is energized via a circuit through lead 856, lead 860, lead 861, normally closed contact K25–1, relay K26, lead 862, normally closed contact K27–2A, and lead 863.

Since the switch S75 is now closed, energization of the relay K26 closes the contact K26–1B (FIGURE 44) to complete a circuit to the scanning drive motor 150. The circuit to the motor 150 is completed via lead 821, contact K33–2A, lead 822, contact K24–2A, lead 870, contact K26–1B, lead 871, lead 872, closed contact K28–3, lead 873, winding 874 of motor 150, switch S75, lead 875, normally closed contact K12–2, leads 876 and 877, closed contact K22–1, lead 878, normally closed switch S1, and lead 879. With the circuit to the scanning motor 150 completed through the winding 874 of the motor, it rotates in the counterclockwise direction as viewed in FIGURE 3 from the No. 1 to the No. 2 position rotating the drum in the same direction.

As soon as the scanning motor starts to rotate and leaves the No. 1 position, the switch S30 is actuated (FIGURES 7 and 41) completing a circuit to the relays K30 and K31 via leads 885 and 886, through the switch contact S30A and lead 887.

Energization of the relay K30 closes the contact K30–1B (FIGURE 41) in the circuit to the card compressor finger solenoids 248. However, this circuit is open at this time since the B contact of switch S30 is open at this time. Energization of relay K30 also opens the contact K30–2A (FIGURE 41) in lead 596 to open the control circuit for motor 103. Opening of this contact thus insures that the drum rotating motor 103 will not be energized during pocket scanning. Energization of relay K30 also opens the contact K30–3 (FIGURE 42) in a card missing circuit to hold this circuit open until the scanning operation is completed.

Energization of relay K31 closes the contact K31–1 (FIGURE 41) to complete a holding circuit to the scanning drive unlock solenoid 143 via lead 890, contact K31–1, lead 891, lead 860, normally closed contact K32–3, and leads 857 and 858. Energization of relay K31 also opens the contact K31–2 (FIGURE 41) in the circuit to the tens and units keyboard release solenoids 916 and 917 to insure that the solenoids are not energized during the scanning operation. The energization of relay K31 also closes the contacts K31–3 and K31–4 (FIGURE 44) in the circuit to the scanning drive motor 150. The closing of the contacts K31–3 and K31–4 at this time has no effect upon the drive to the scanning motor since the contacts K28–3 and K28–4 are closed.

When the scanning motor has rotated in the counterclockwise direction as viewed in FIGURE 7 through an arc of approximately 150°, the selected pocket of the drum will have been exposed across its entire width to the air stream admitted from the orifice of nozzle 15. At this time the switch actuator blade 210 attached to the shaft of motor 150 engages the actuator of switch S40 and the drum is in its No. 2 position at the limit of scanning counterclockwise rotation. The closing of switch S40 (FIGURES 7 and 41) energizes the relay K25B via a circuit through lead 895, switch S40, lead 896, the latch relay K25B, lead 897, lead 805, contact K28–2A, and lead 805. Energization of relay K25B opens the contact K25–1 to open the circuit to the relay K26 and thus de-energize this relay. De-energization of relay K26 closes the contact K26–1A (FIGURE 44) and opens the contact K26–1B. This opens the circuit to the winding 874 of scanning motor 150 and closes a circuit to winding 900 of motor 150 to reverse the direction of rotation of the motor as a result of the consequent phase shift. The circuit to winding 900 of motor 150 is completed via lead 821, contact K33–2A, lead 822, contact K24–2A, lead 870, contact K26–1A, lead 901 and lead 902, contact K31–4, lead 903, contact K32–1, lead 904, winding 900 of motor 150, closed switch S75, lead 875, contact K12–2, lead 876, lead 877, contact K22–1, lead 878, closed switch S1 and lead 879.

The scanning motor then rotates in the clockwise direction as viewed in FIGURES 3 and 7 until the No. 1 position of the drum is reached at which time the switch S30 will again be actuated. Assuming that no card has yet been found and raised into a position in engagement with the lower drive rolls, the closing of the contact S30–A at the No. 1 position again initiates a scanning cycle by re-energizing the relays K30 and K31. This cycle will be repeated until the scanning timer T stops the cycle by closing the timer switch contact T1 (FIGURE 42).

*Card missing circuit*

If the preselected card is not found during scanning of the selected pocket, the preselected card is missing from the file. A card missing circuit is therefore provided which is operable to stop the scanning operation, condition the machine for selection of another card, and indicate to the machine operator via a flashing lamp that the card is not in the file. The card missing control circuit is initiated upon closing of the contact T1 (FIGURE 42) of timer T (FIGURE 44). Closing of the timer switch contact T1 completes a circuit to the relay K27 via lead 910, contact T1, lead 911, through relay K27, via lead 912, through closed contact SB–2A, lead 807, lead 808, switch S50, and lead 809. Energization of relay K27 pulls in the holding contact K27–1 to maintain the circuit around the switch T1 which only closes momentarily. Energization of relay K27 also closes the contact K27–2B (FIGURE 42) opening the circuit to the relay K26 and closing a closed loop circuit around the capacitor C9 via leads 914 and 915 to discharge this capacitor and condition the relay K24 for pulsing during the next cycle of operation. Energization of relay K27 also closes the contact K27–3B (FIGURE 41) which closes the circuit to the tens and units keyboard release solenoids 916 and 917 through which the capacitor C12 discharges to momentarily pulse the solenoids. The circuit to the tens and units keyboard release solenoids 916 and 917 is completed from the charged capacitor C12 via lead 918, through the contact K27–3B, closed contact K31–2, and leads 919 and 920. Energization of the tens and units keyboard release solenoids 916 and 917 pops up the actuated tens and units keyboard buttons causing the tens and units A contacts 800 and 801 respectively and B contacts 802 and 803 respectively to be opened conditioning the keyboard for selection of the next card.

At this point it should be noted that the solenoids 284 (FIGURE 41) which when energized close the valves 281 (FIGURE 33) in the ducts 272 and 273, are connected in parallel with the tens and units keyboard release solenoids 916 and 917. The solenoids 284 are simultaneously actuated at this time. A voltage booster capacitor C20 is connected in parallel with the solenoids 284. The added voltage however has no effect upon the solenoids 916 and 917 since a diode 922 is connected in lead 923 between the solenoids 916 and 917 and the solenoids 285. This diode effectively blocks out the additional voltage or acts as a choke to prevent the capacitor C20 from effecting actuation or energization of the solenoids 916 and 917.

As set forth above, energization of relay K27 opened the contact K27-2 to de-energize the relay K26. De-energization of relay K26 closes the contact K26-1A to complete the circuit to the winding 900 of the scanning motor 150. As explained earlier, when the winding 900 is energized the motor 150 rotates in the clockwise direction as viewed in FIGURE 3 and causes the drum to rotate in the clockwise direction back toward the No. 1 position. At this time the relay K27 is energized so that the contact K27-4 is open. Since the drum is not in the No. 1 position, contact S30A of switch S30 is closed so that the relays K30 and K31 remain energized until the drum reaches the No. 1 position.

At the No. 1 position of the drum, the relays K30 and K31 are de-energized. The contact K31-4 then opens to de-energize the scanning motor 150. De-energization of relay K31 closes the contact K31-2 completing the circuit from the capacitor C12 through the tens and units keyboard release solenoids 916 and 917 causing those buttons to pop up and open the units and tens A and B contacts conditioning the card selection circuit for the next cycle of operation.

At the No. 1 position of the drum the relays K30 and K31 are de-energized closing the contact K30-3 (FIGURE 42). Since the relay K27 is energized at this time, the contact K27-1 is closed and a circuit is completed to a card missing flasher unit 925 via lead 926, lead 927, closed contact K30-3, lead 928, lead 911, contact K27-1 and lead 910. Energization of the card missing flasher unit energizes a circuit to a card missing light 929 on the keyboard. The card missing light 929 is connected in parallel with the card missing flasher unit 925 via leads 930 and 931. The flasher unit will continue to cause the card missing light 929 to flash until the circuit to the relay K27 is opened by pushing the search button 550 at the keyboard which causes the contact SB2 to open.

*Card found circuit*

As stated earlier, the blower motor 830 began issuing an air stream from the orifice of the nozzle 15 upon initiation of the scanning operation. Simultaneously, the circuit to the orifice opening solenoids 320 (FIGURES 31 and 41) was completed via a circuit through lead 932, lead 933, normally closed contact S3A of switch S3, and lead 934. When the selected card passes over the orifice of the nozzle 15, the card is ejected from the pocket upwardly to a position in which it engages the bottom of the selector fingers and passes between the lower rollers of the card transport mechanism. At this time the rollers are rotating since the roller drive motor 365 (FIGURE 44) is actuated upon the energization of relay K22 (FIGURE 42). The relay K22 was energized as was explained earlier upon initiation of the scanning cycle. The circuit to the roller drive motor 365 is completed from the rectifier bridge 935 via lead 936, through the rheostat R6, via lead 937, through the normally closed contact K40-1, via lead 938, through closed contact K22-2, via lead 939, through normally closed switch S22, via lead 940, and through the normally closed contacts K29-1A and K29-2A, and via leads 941 and 942. The motor 365 is a D.C. shunt wound motor which when energized through the A contacts of contacts K29-1 and K29-2, drives in the clockwise direction as viewed in FIGURE 13. When the circuit to the roller drive motor is completed through the K29-2B and K29-1B contacts, the polarity of the D.C. current to the motor is reversed causing the motor to reverse its direction of rotation. By adjusting the setting of the rheostats R5 and R6, the speed of the motor 365 may be adjusted. When a card enters between the lower drive rollers, the switches S1, S2, S3 and S4 will all be actuated.

Actuation of the switch S1 (FIGURE 44) causes this normally closed switch to open, immediately de-energizing the scanning motor 150. Simultaneously the normally open switch S2 (FIGURE 42) closes completing a circuit to the relay K40 through a capacitor C21 causing the relay K40 to pulse. The circuit to the relay K40 is completed via lead 584, through the bank of switches 563, via leads 812, normally closed switch S61, closed contact K21-2, leads 813, 814 and 945, through the closed switch S2, through a diode 946 and a capacitor C21, and via leads 947 and 948. Energization of the relay K40 causes the contact K40A-1 to close completing a closed loop circuit 949 around the capacitor C21 to discharge the capacitor. The pulsing of relay K40 causes the contact K40-1 (FIGURE 44) to momentarily open and thus open the circuit to the drive roll motor 365.

Actuation of switch S3 (FIGURE 41) opens the circuit to the orifice coil 320 permitting the valve 309 in the air nozzle 15 to immediately be closed by air pressure within the nozzle. Simultaneously actuation of the switch S3 closes a circuit to the solenoids 283 opening the air ducts 272 and 273 to the downwardly directed nozzles 270 and 271. The circuit to the solenoids 283 is completed via lead 934, through contact S3B of switch S3, and via leads 950 and 951.

Actuation of the switch S4 (FIGURE 41) closes the contact S4B completing a circuit to the relay K25B via lead 906, contact B of switch S4, lead 954, through diode 955, and via leads 956, 896, 897, 805, contact K28-2A and lead 804. Energization of the relay K25B opens the contact K25-1 to de-energize the relay K26. De-energization of the relay K26 closes the contact K26-1A to energize the winding 900 of the scanning motor 150 causing the scanning motor to drive the drum immediately to the zero position. Thus regardless of the direction of rotation of the drum at the time a card enters between the lower drive rollers, the drum will immediately start rotation toward the zero or card in-file position.

When the nozzle orifice gate 309 closes, it disengages the actuator of switch S80 (FIGURES 31 and 41) causing the switch S80 to open. Opening of switch S80 opens the circuit to the tens and units interposer coils 845 and 846 which lifts the pins from engagement with the selector fingers 280 and allows the selector fingers 280 to be retracted by springs (not shown). Thus the switch S80 insures that the air supply to the orifice of nozzle 15 is completely shut off before the preselected selector fingers 280 are retracted.

After the relay K40 (FIGURE 42) has pulsed, the contact K40-1 (FIGURE 44) again closes to complete the circuit to the drive roll motor 365. The drive roll motor continues to drive or feed the preselected card upwardly into the upper drive rolls. The upper drive rolls are spaced a distance less than the height of the cards away from the lower drive rollers so that the switches S1, S2, S3 and S4 will all be actuated at the time that the upper drive roll actuated switches S10, S11 and S12 are initially actuated.

Actuation of the switch S11 (FIGURE 41) causes it to close, completing a circuit to the tens and units keyboard release solenoids 916 and 917 as well as to the solenoids 284 (FIGURE 41) of valves 281 (FIGURE 33). The circuit to the tens and units keyboard release solenoids 916 and 917 is completed via leads 624, 625, normally closed contact S-21A, lead 961, normally closed contact S27A, lead 962, switch S11, and leads 963 and 964. Since the solenoids 284 are connected in parallel with the solenoids 916 and 917 these solenoids too are actuated by the closing of switch S11.

Actuation of the tens and units keyboard release solenoids 916 and 917 opens the units and tens A contacts 800, 801 and B contacts 802, 803 to condition the card selection circuit for selection of the next card during the next cycle of operation of the machine. When the tens and uits A contacts 800, 801 are opened, the circuit to the relay K21 (FIGURE 42) opens, de-energizing this relay. When the relay K21 is de-energized, the contact K21-2 opens to de-energize the relays K22, K23 and K24.

De-energization of the relay K22 opens the contact K22-2 and the circuit to the drive roll motor 365. The drive roll motor 365 then coasts to a stop as does the preselected card. The preselected card will stop in a position in engagement with the stop bar 380 (FIGURE 22) on the card transport mechanism. When the relay K22 is de-energized, the contact K22-1 (FIGURE 44) opens in the circuit to the scanning drive motor 150. However, this motor continues to be driven since the circuit is completed at this time upon the closing of switch S12 which is actuated by the card passing through the upper drive rollers. De-energization of the relay K23 causes the contact K23-1 to open opening the circuit to the blower motor 830 and the scanning timer T.

Actuation of the upper drive roll switch S10 closes the contact S10B (FIGURE 41) in the circuit to the card compressor finger solenoids 248. This circuit is not completed, however, until the switch S30 is actuated at the No. 1 drum position. Actuation of the switch S30 opens the contact S30A, de-energizing the relays K30 and K31. Simultaneously the contact K30-1B closes completing a circuit to the card compressor finger solenoids 248 causing the card compressor fingers to move into the drum. The circuit to the card compressor finger solenoids 248 is completed via lead 906, closed switch S4, lead 970, switch S10, switch S20, contact K30-1B, lead 972, lead 971, switch contact S30-B and lead 887.

De-energization of the relay K31 upon the actuation of switch S30 causes the contact K31-4 (FIGURE 44) to open. However, the scanning drive motor 150 continues to rotate since the contact K27-4 of relay K27 is now closed as a result of the relay K27 having been de-energized. As viewed in FIGURE 3 the scanning drive motor continues to rotate in the counterclockwise direction until the drum reaches the zero or card compressed position. At this position, the finger 210 engages the switch S50 (see FIGURE 7). When the drum reaches the zero position and the cards within the pocket are fully compressed, the relay K32 (FIGURE 41) is energized upon the actuation of switch S50. Actuation of switch S50 completes a circuit to relay K32 via lead 809, switch contact S-50A, lead 975 and lead 717.

Energization of the relay K32 causes the contact K32-1 (FIGURE 44) to open de-energizing the scanning drive motor 150. Energization of the relay K32 also closes the contract K32-2B (FIGURE 41) to condition the circuit to the relays K28 and K29 for card in-filing. Simultaneously the contact K32-3 (FIGURE 41) opens to open the circuit to the scanning drive unlock solenoid 143 releasing the locking lever 135 so that it may be spring biased back into engagement with the locking lug 138 on the rocking assembly 104. At this time the aperture 137 of the locking lever does not slip over the lug on the rocking assembly since the drum is not in the No. 1 position, in which the aperture engages over the lug. Energization of the relay K32 also closes the contact K32-4 to complete a closed loop circuit around the capacitor C9 to discharge the capacitor and condition the circuit to the relay K24 for pulsing during the next cycle of operation.

At this point the preselected card will have traveled upwardly in the card transport mechanism to its upper limit of movement and engaged the upper limit pivot bar 380 (FIGURE 22). When the card engages the bar 380 it causes the bar to actuate the switches S20, S21 and S22.

Actuation of the switch S21 opens the contact S21A (FIGURE 41) and in so doing opens the circuit to the tens and units keyboard release solenoids 916 and 917 so as to de-energize these solenoids and condition them for the next cycle of operation. Actuation of the switch S20 closes the contact S20B to complete a secondary circuit to the card compressor finger solenoids 248. Switch S20 is connected in parallel with switch S10 and therefore merely acts as a safety switch to insure that if the switch S10 fails, a circuit will be completed through the switch S20 to the card compressor finger solenoids 248. Therefore unless both switches S10 and S20 fail, it will not be possible for the drum to rotate to the zero position or card in-filing position without the cards within the pocket having been compressed. Actuation of the switch S22 (FIGURE 44) opens the circuit to the drive roll motor 365 causing this motor to stop rotation. At this point it should be noted that as the card entered the upper drive rolls, the circuit to the relay K22 was opened by the opening of contact K21-2. However, at that time the relay K22 was not immediately de-energized since the capacitor C10 connected in parallel with the relay maintained it energized for a period of time long enough for the card to reach the upper limit of its travel and engage the upper limit pivot bar 380. Therefore the circuit to the drive roll motor is maintained through the contact K22-2 until the card engages the upper limit bar 380 and opens the switch S22. At that time the drive roll motor discontinues rotation.

*Card return or in-filing*

With the card in the card transport mechanism and at its upper limit of travel it may be viewed via an optical projector or a TV projector depending upon the condition of the switch 508 (FIGURE 44). After the machine operator has viewed the card he actuates the card return button SR at the keyboard to return the card to the file. Actuation of button SR momentarily closes the contact SR-1 (FIGURE 41) to energize the relays K28 and K29 via a circuit through lead 980, closed contact K32-2B, lead 981, closed switches S72 and S73, lead 982, the closed contact SR-1, leads 983 and 984, contact K30-2B and lead 597. The switches S72 and S73 (FIGURES 24 and 41) were both closed upon energization of the card compressor solenoids 248. Actuation of the search return button SR at the keyboard also momentarily closes the contacts SR-2 (FIGURE 41) and SR-3 (FIGURE 43) and opens the normally closed contact SR-4 (FIGURE 41). Momentary closing of the contact SR-2 pulses the relay K25A (FIGURE 41) via leads 725, 726 and 908. The pulsing of this relay closes the contact K25-1 to condition the circuit to the relay K26 for the next cycle of operation. Momentary closing of the contact SR-3 of the search return button energizes the relay K12 via a circuit completed through leads 727, 728, 729 and 632. Simultaneously the capacitor C11 connected in parallel with the relay K12 is charged so that upon opening of the contact SR-3 the relay K12 remains energized until the capacitor C11 discharges. Energization of the relay K12 opens the contact K12-2 (FIGURE 44) in the scanning motor circuit and this insures that the scanning motor does not start to rotate to the No. 1 or cycle start position until after the preselected card has been returned to the drum. Actuation of the search return button SR also opens the normally closed contact SR-4 (FIGURE 41) to prevent energization of the relay K33 at this time.

At this point it should be noted that normally open contacts K34-1, K34-2 and K34-3 of relay K34 are connected in parallel with the normally open contacts SR-1, SR-2 and SR-3 respectively. The normally closed contact K34–4 of relay K34 is connected in series with the normally closed contact SR–4. Thus energization of the relay K34 (FIGURE 41) accomplishes the same functions as actuation of the search return button SR at the keyboard. Relay K34 is momentarily energized upon actuation of an auxiliary search return button SRA mounted upon the filing cabinet (see FIGURE 1). The circuit to the relay K34 is completed via lead 740, auxiliary search return switch SRA, lead 741, through the relay K34 and via leads 1003 and 717. Thus the card in-filing or return may be actuated or instituted at either the filing cabinet or the remote keyboard.

Energization of the relay K29 closes the contacts K29–1B and K29–2B to energize the drive roll motor 365 and drive the motor in the counterclockwise direction as viewed in FIGURE 12. The circuit to the drive roll motor is completed from the rectifier bridge 935 via leads 942, 990, contact K29–1B, through the motor 365, via contact K29–2B, lead 991, through the rheostat R5 and via leads 992 and 936. The drive roll motor therefore rotates to drive the card in the transport mechanism downwardly into the gap between the drum partition 35 and the compressed deck of cards within that pocket.

Energization of relay K28 closes the contact K28–1 (FIGURE 41) to complete a circuit to the scanning drive unlock solenoid 143 via leads 993, 994, through diode 995, and via leads 996 and 858. Energization of the scanning drive unlock solenoid 143 causes the latch 135 to be disengaged from the scanning drive rocker assembly 104 and thus insures that the latch 135 does not interfere with return of the drum to the No. 1 or cycle start position from the zero or card return position.

Energization of the relay K28 also closes the contact K28–2B (FIGURE 42) in the circuit to the card compressor finger solenoids 246 (FIGURE 41). The solenoids 246 will be energized immediately upon closing of the contact K32–2A and the card compressor fingers moved out of the drum. The contact K32–2A closes immediately upon de-energization of relay K32 which is de-energized as soon as the drum moves away from the zero position and opens the contact S–50A of switch S50. The circuit to the card compressor finger solenoids 246 is then completed via lead 980, through contact K32–2A, lead 997, lead 998, through contact K28–2B and via lead 804.

Energization of the relay K28 also opens the normally closed contact K28–3 (FIGURE 44) and closes the contact K28–4 to start the scanning drive motor rotating in the counterclockwise direction. The circuit to the scanning motor 150 is completed at this time via lead 821, contact K33–2A, lead 822, contact K24–2A, lead 870, contact K26–1B, lead 871, contact K31–3, lead 873, through winding 874 of motor 150, through closed switch S75, via lead 875, through normally closed contact K12–2, via lead 876, through closed contact K28–4, via lead 878, through switch S1, and via lead 879. The motor thus rotates from the zero position to the No. 1 position.

When the drum reaches the No. 1 or cycle start position, the switch S30 is actuated causing its contact S–30A to open de-energizing the relays K30 and K31. De-energization of the relay K31 opens the normally open contact K31–3 to de-energize the scanning motor.

De-energization of relay K30 closes the contact K30–1A and thereby completes the circuit to the relay K25A via leads 907 and 908. Energization of the relay K25A closes the contact K25–1A to condition the circuit to the relay K26 for the next cycle of operation.

The drive roll motor continues to rotate until the relays K30 and K31 are de-energized. De-energization of relay K30 opens the contact K30–2B and de-energizes the relays K28 and K29. De-energization of relay K29 opens the contacts K29–2B and K29–1B to condition the drive roll motor 365 for rotation in the clockwise direction upon initiation of the next cycle of operation. The drive roll motor 365 does not rotate in the clockwise direction at this time since the contact K22–2 is open.

With the drum returned to the No. 1 or starting position and the preselected card returned or in-filed into the drum, all of the relays of the control circuit are de-energized and the machine is in condition for the next cycle of operation upon selection of another card at the console or keyboard.

*Single card removal from file*

To completely remove a card from the file, the platform 398 upon which the upper limit gate 380 is mounted, may be pivoted to the position shown in FIGURE 23. In this position a preselected card will pass completely through the transport mechanism and be ejected from the top. Manual pivoting of the platform 398 into the position shown in FIGURE 21 actuates the switches S25, S26, S27 and S28. With the gate open, the machine cycle may be initiated by punching one of the thousands, hundreds, tens and units keyboard buttons and the search button. The machine will then operate and go through its normal cycle and the card will be ejected through the card transport mechanism. This gate may also be opened at any time during the machine cycle. If no card is reinserted into the transport mechanism, the return button can be punched and the machine will go through its normal operating cycle and return to the No. 1 or cycle start position of the machine. In a normal machine cycle with the gate 380 blocking card ejection from the file, the switches S20, S21 and S22 prevent the machine from continued cycling and condition it for return of the preselected card. The switches S25, S26, S27 and S28 therefore are necessary to take over the functions of the switches S20, 2S1 and S22 with the gate open.

Closing of switch S26 (FIGURE 44) completes a circuit to the drive roll motor causing the drive roll motor 365 to rotate in the counterclockwise direction as viewed in FIGURE 13 at all times that the gate 380 is open. The circuit to the drive roll motor from rectifier bridge 935 is completed via lead 936, rheostat R6, lead 937, closed contact K40–1, through switch S26, lead 999, closed switch S22, contacts K29–1 and K29–2, lead 941 and lead 942.

Actuation of the switch S27 (FIGURE 41) closes the contact S27B in the circuit to the tens and units keyboard release solenoids 916 and 917 and the doubles prevention air nozzle close solenoids 284 so that the circuit to these solenoids is completed as the preselected card passes through the upper drive rolls and closes switch S11. When the preselected card has passed through the upper drive rolls, the switch S11 again opens to de-energize the solenoids 916, 917 and 284.

Closing of the switch S28 (FIGURE 41) completes a circuit to a card transport gate open light 1000 mounted upon the keyboard. The circuit to the gate open light is completed via lead 1001, switch S28, and leads 1002, 1003 and 717.

Closing of the switch S25 energizes the relay K33 which functions to complete a circuit to the scanning motor even after the cards have gone through the upper drive rolls so that the drum will be re-cycled back to the zero position for card in-filing or card return. The relay K33 is energized upon closing of switch S25 via a circuit through lead 1004, normally closed contacts SR–4 and K34–4, the relay K33, lead 1005, closed switch S25, lead 1006, leads 971 and 972, closed contact K30–1B, and the normally closed switches S20, S10, S4 and lead 906. Immediately upon energization of relay K33 a holding contact K33–1 is energized to maintain the relay K33 energized via lead 809, closed switch contact S50B, lead 808, contact K33–1, lead 1008, lead 1005, contacts K34–4 and SR–4 and lead 1004. The relay K33 thus remains energized until the drum reaches the zero or card in-filing position when the switch contact S50–B opens. Energization of relay K33 closes the contacts K33–2B and K33-3 to complete a circuit to the winding 900 of the scanning motor 150 so that the motor rotates in the counterclockwise direction as viewed in FIGURE 7 until the zero position is reached and the switch S50 actuated.

Single new card in-filing

Occasionally it is necessary to insert a single new card into the file either as an additional card or to replace an old one. For this purpose an in-filing button 1010 is provided upon the file cabinet. To insert a card it is only necessary to pull the gate 380 out of the way into the position shown in FIGURE 23 and insert a new card into the transport mechanism. The in-file button 1010 is then pushed causing the machine immediately to move to the zero or card in-filing position. The actuation of the card in-file button closes the double-pole switch and momentarily closes the contacts IN-1 and IN-2. The closing of contact IN-1 energizes the relay K33 (FIGURE 41) closing the contacts K33-2B and K33-3, energizing the winding 900 of scanning motor 150 and causing the scanning motor to rotate in the counterclockwise direction as viewed in FIGURE 7 until the drum reaches the zero position. The circuit to the relay K33 is completed at this time via lead 1004, closed contact SR-4, closed contact K34-4, via lead 1011, through closed contact IN-1, via lead 1012, via the closed hundreds push button A contacts bank 563 and via lead 584. Since the in-file button or switch 1010 is only momentarily energized, a delay dropout capacitor C14 is connected in parallel with relay K33 to insure that the relay remains energized for a sufficient length of time for the drum to reach the zero or card return position. Actuation of the in-file button 1010 also closes the contact IN-2 to complete a circuit to the card compressor finger solenoids 248 via lead 1012, the contact IN-2, lead 1015, lead 1016, lead 973, closed contact S-30B and lead 887. The card may then be returned to the drum by actuation of either the search return button SR on the remote keyboard or the auxiliary card return button SRA on the housing.

Keyboard clear

If during the pocket and card selection, the wrong combination of keyboard buttons are actuated it is possible to clear the keyboard without going through the process of selecting an undesired card and then returning it to the file. This may be accomplished by actuation of the keyboard clear button CB on the keyboard. Actuation of the keyboard clear button momentarily closes the contact CB-1 to complete a circuit to the thousands and hundreds release solenoids 711 and 712 via leads 1020, 1021 and 1023. Actuation of the clear button CB also momentarily closes the contact CB-2 to complete a circuit via leads 1020, 1024, and 1025 to the tens and units keyboard release solenoids 916 and 917. Actuation of these solenoids immediately causes the buttons to pop up ready for selection of another pocket and card. Actuation of the keyboard clear button CB also closes the contact CB-3 (FIGURE 42) to complete a closed loop circuit around the capacitor C9 to discharge this capacitor and condition it for pulsing of the relay K24 during the next cycle of operation.

At this point it should also be noted that a normally open contact 545-1 is also provided in parallel with the capacitor C9. The contact 545-1 is a contact of the reset switch or button 545 also operable to discharge the capacitor C9 after the machine is stopped in the event of an emergency by the emergency stop switch 548.

Bulk in-filing

When initially placing the cards in the drum or when replacing all of the cards in the drum, it is preferable that all of the cards in a pocket be inserted simultaneously rather than one at a time. To this end this machine incorporates a bulk in-filing feature by means of which all of the cards may be removed from and inserted into any pocket simultaneously. When it is desired to bulk in-file, the card transport mechanism 17 is manually moved forward to the position shown in FIGURES 3 and 17. Movement of the selector head in the forward direction to uncover a complete pocket actuates the switches S61, S62 and S63 (see FIGURES 16 and 17). Actuation of the switch S61 (FIGURE 42) opens this switch in lead 812, opening the card selection control circuit so that the drum cannot be rocked or scanned during bulk in-filing. Actuation of switch S62 (FIGURE 43) opens this normally closed switch in lead 596 thereby preventing rotation of the drum to a new pocket until safety switch S60 closes. The safety switch S60 is connected in parallel with the switch S62 so that with the card transport mechanism 17 moved forwardly to expose a pocket, the drum cannot be rotated until the switch S60 is closed. Switch S60 is actuated upon manual closing of the safety door 406 (FIGURE 3) which covers the aperture in the cover. To select a new pocket with the card transport mechanism in its forward position, the safety door 406 must be moved forwardly over the pocket thereby closing safety switch S60. The drum may now be rotated and the motor 103 energized by selection of a pocket at the keyboard and actuation of the search button. The safety door thus functions to prevent rotation of the drum while an operator has his hand or fingers in the drum.

Switch S63 (FIGURE 41) closes when the card transport mechanism 17 is in its forward position to complete a circuit to a lamp 1030 mounted upon the housing 10 of the file. The safety switch S63 is connected in series with a normally closed contact K10-2 of relay K10 so that the light 1030 is operable to indicate that the platen head is in its forward position and the drum is not rotating. The circuit to the light 1030 is completed via lead 1031, contact K10-2, switch S63, lead 1032, lead 1002, lead 1003 and lead 717. This light thus enables an operator during bulk in-filing to open the safety door 406 only after the drum rotation has ceased.

As should now be obvious, this machine is operable to select a new pocket without scanning the pocket, or alternatively, to scan a pocket without selecting a new one. Thus by actuation of the units and tens buttons and actuation of the search button the pocket which is in the 12:00 position will be scanned. Alternatively by actuation of one of the hundreds and one of the thousands buttons, a new pocket may be selected without going through the scanning operation of that pocket. In the event that one of the units, one of the tens, one of the hundreds and one of the thousands buttons and the search button are all actuated, the drum will first rotate to the proper pocket so that pocket selection always has preference over card selection. However, pocket selection cannot take place during card selection. To this end, the contact K30-2 of relay K30 is provided which prevents pocket selection during scanning by opening the common line to the pocket selection control circuit.

Summary of machine operation

Upon selection of one of the uits, tens, hundreds, and thousands buttons and actuation of the search button this machine moves via the shortest route to the selected pocket at a fast rate of rotation. The drum rotating motor 103 is dynamically braked at the selected pocket and the drum coasts to a stop in a position in which the selected pocket has moved past the 12:00 position. Thereafter the drum is immediately rotated in the opposite direction at a slow rate of speed until the selected pocket is in the 12:00 position. The selector fingers are then moved outwardly over the cards in the selected pocket to restrain all but the preselected card against movement relative to the remaining cards in the pocket. The blower motor is then pulsed with high voltage causing it to come up to full speed rapidly and thereafter the voltage reduced to maintain it at its running speed. The drum is then oscillated relative to the nozzle so that all of the cards in the drum are oscillated above the orifice of the nozzle 15. As soon as the preselected card enters and leaves the lower drive rollers of the card transport mechanism 17, the drum rotates back to its original No. 1 or scanning start position. Simultaneous with the entry of the selected card into the card transport mechanism the air stream from the air nozzle 15 is stopped by closing of the valve 309 in the nozzle and the downwardly directed doubles prevention air streams from the nozzles 270, 271 are initiated by opening of valves 283 in the ducts 272 and 273. The card transport motor 365 is then reactuated to cause the rollers of the transport mechanism to carry the card upwardly in the card transport mechanism 17 to a viewing position. The card compressor fingers 20 then enter the drum and the drum rotates in the counterclockwise direction to the zero or cards compressed position. In this position of the drum a gap is provided between the forward card in the pocket and the drum partition wall 35. The drum is now ready for return of the preselected card to the drum.

Upon actuation of the search return button SR, the drive roll motor 365 rotates in the counterclockwise direction causing the drive roll motor to transport the card back into the drum after which the scanning motor is energized causing the drum to rotate back to its starting position ready for selection of the next pocket and card.

Having described our invention we claim:

1. Apparatus for selecting a predetermined coded card from a plurality of coded cards comprising,
a card carrying drum for storing a class of coded cards in each of a plurality of compartments located around the periphery of said drum,
a plurality of cards arranged in random order in each of said compartments,
card selection means including an air ejection nozzle for sequentially scanning all of the randomly arranged cards in a selected class and for locating a predetermined card within said selected class and moving said card to a physically discrete position relative to the remainder of the cards within said class,
motor means for effecting relative indexing movement between said compartments and said card selection means to locate a selected compartment adjacent said card selection means,
control means operable to automatically actuate said card selection means in response to location of a selected compartment adjacent said card selection means, and
card transport means including motor driven rollers operable automatically in response to movement of said preselected card to a physically discrete position to remove said card from said file.

2. Apparatus for selecting a predetermined coded card from a plurality of coded cards comprising,
endless card carrier means for storing a discrete class of coded cards in each of a plurality of compartments located around the periphery of said carrier,
a plurality of cards arranged in random order in each of said compartments,
card selection means for scanning all of the randomly arranged cards in a selected class and for locating a predetermined card within a selected class and moving said card while suspended in an air stream directed against one edge of the card to a physically discrete position relative to the remainder of the cards within said class, and
control means including a motor for effecting relative indexing movement between said compartments and said card selection means by sequentially:
(a) effecting said movement at a fast rate of speed to locate a selected compartment approximately adjacent said card selector means,
(b) effecting said movement at a slow speed to locate said selected compartment immediately adjacent said card selection means, and
(c) scanning all of the randomly arranged cards in a selected class to locate a predetermined card and move it to said physically discrete position.

3. Apparatus for selecting a predetermined coded card from a plurality of coded cards comprising,
endless carrier means for storing a discrete class of coded cards in each of a plurality of compartments located around the periphery of said carrier,
a plurality of cards arranged in random order in each of said compartments,
card selection means for scanning all of the randomly arranged cards in a selected class to locate a predetermined card within said selected class and moving said card by means of an air stream directed against one edge of the card to a physically discrete position relative to the remainder of the cards within said class, and
control means including a motor for effecting relative indexing movement between said compartments and said card selection means by sequentially:
(a) effecting said movement via the shortest path of movement in a first direction at a fast rate of speed to locate a selected compartment approximately adjacent said card selector means,
(b) effecting said movement in a direction opposite the first direction at a slow speed to locate said selected compartment immediately adjacent said card selection means, and
(c) scanning all of the cards in said selected compartment in response to location of said selected compartment at said card selection means.

4. Apparatus for selecting a predetermined coded card from a plurality of coded cards comprising,
means for storing a discrete class of coded cards in each of a plurality of compartments,
a plurality of cards arranged in random order in each of said compartments,
card selection means for locating a predetermined card within a selected class and moving said card to a physically discrete position relative to the remainder of the cards within said class,
said card selection means including a normally inactive gaseous stream emitting nozzle to sequentially deliver a gaseous velocity stream against the edges of cards of a selected class,
control means including a motor for effecting relative indexing movement between said compartments and said card selection means to locate a selected compartment adjacent said card selection means, and
control means operable to automatically activate said nozzle in response to location of a selected compartment adjacent said card selection means.

5. Apparatus for selecting a predetermined coded card from a plurality of coded cards comprising,
endless carrier means for storing a discrete class of coded cards in each of a plurality of compartments located around the periphery of said carrier,
a plurality of cards arranged in random order in each of said compartments,
card selection means for locating a predetermined card within a selected class and moving said card to a physically discrete position relative to the remainder of the cards within said class,
said card selection means including a normally inactive gaseous stream emitting nozzle to sequentially deliver a gaseous stream against the edges of cards of a selected class,
control means including a motor for effecting relative indexing movement between said compartments and said card selection means via the shortest path of movement to locate a selected compartment adjacent said card selection means, and control means operable to automatically activate said nozzle in response to location of a selected compartment adjacent said card selection means.

6. Apparatus for selecting a predetermined coded card from a plurality of coded cards comprising, means for storing a discrete class of coded cards in each of a plurality of compartments, a plurality of cards arranged in random order in each of said compartments, card selection means for locating a predetermined card within a selected class and moving said card to a physically discrete position relative to the remainder of the cards within said class, said card selection means including a normally inactive gaseous stream emitting nozzle to sequentially deliver a gaseous stream against the edges of cards of a selected class, control means including a motor for effecting relative indexing movement between said compartments and said card selection means to locate a selected compartment adjacent said card selection means, control means operable to activate said nozzle in response to location of a selected compartment adjacent said card selection means, and card transport means operable automatically in response to movement of said preselected card to a physically discrete position to remove said card from said file.

7. Apparatus for selecting a predetermined coded card from a plurality of coded cards comprising, means for storing a discrete class of coded cards in each of a plurality of compartments, a plurality of cards arranged in random order in each of said compartments, card selection means for locating a predetermined card within a selected class and moving said card to a physically discrete position relative to the remainder of the cards within said class, said card selection means including a normally inactive gaseous stream emitting nozzle to sequentially deliver a gaseous stream against the edges of cards of a selected class, control means including a motor for effecting relative indexing movement between said compartments and said card selection means to locate a selected compartment adjacent said card selection means, control means operable to automatically actuate said nozzle in response to location of a selected compartment adjacent said card selection means, and card transport means including motor driven rollers operable in response to movement of said preselected card to a physically discrete position to remove said card from said file.

8. Apparatus for selecting a predetermined coded card from a plurality of coded cards comprising, carrier means for storing a discrete class of coded cards in each of a plurality of compartments, a plurality of cards arranged in random order in each of said compartments, card selection means for scanning all of the randomly arranged cards in a selected class and for locating a predetermined card within a selected class and moving said card by means of an air stream directed against one edge of the card to a physically discrete position relative to the remainder of the cards within said class, a variable speed reversible motor for effecting relative indexing movement between said compartments and said card selection means to locate a selected compartment adjacent said card selection means, control means operable to automatically actuate said card selection means in response to location of a selected compartment adjacent said card selection means, and a digital selector switch having at least one rotatable commutator disc electrically connected to said motor to control indexing of said carrier via the shortest path of movement at first a fast rate of movement to locate said selected compartment approximately adjacent said selection means and then at a slow rate of movement to locate said selected compartment immediately adjacent said selection means.

References Cited by the Examiner
UNITED STATES PATENTS

| | | | |
|---|---|---|---|
| 2,294,681 | 9/1942 | Moon | 235—61.116 |
| 2,644,458 | 7/1953 | Meagher | 129—16.1 |
| 2,796,308 | 6/1957 | Knittel | 312—186 |
| 2,848,677 | 8/1958 | Stockwell | 318—467 |
| 2,872,053 | 2/1959 | Ulrich | 209—110 |
| 2,918,615 | 12/1959 | Goetz | 318—467 |
| 2,969,876 | 1/1961 | Luhn | 209—110 |
| 2,985,726 | 5/1961 | Handel | 200—11.23 |
| 3,052,509 | 9/1962 | Conde-Garriga. | |
| 3,055,131 | 9/1962 | Novak | 129—16.1 |
| 3,059,984 | 10/1962 | Handel | 312—223 |
| 3,105,593 | 10/1963 | Fredkin | 209—110 |
| 3,126,008 | 3/1964 | Geddes | 129—16.1 |

M. HENSON WOOD, Jr., *Primary Examiner.*

ROBERT B. REEVES, *Examiner.*